(12) United States Patent
Alderson

(10) Patent No.: US 11,509,672 B2
(45) Date of Patent: *Nov. 22, 2022

(54) METHOD AND SYSTEM FOR LIMITING THE RANGE OF DATA TRANSMISSIONS

(71) Applicant: Hopzero, Inc., Austin, TX (US)

(72) Inventor: William Nicholas Alderson, Austin, TX (US)

(73) Assignee: Hopzero, Inc., Austin, TX (US)

(*) Notice: Subject to any disclaimer, the term of this patent is extended or adjusted under 35 U.S.C. 154(b) by 144 days.

This patent is subject to a terminal disclaimer.

(21) Appl. No.: 16/889,385

(22) Filed: Jun. 1, 2020

(65) Prior Publication Data

US 2020/0296125 A1    Sep. 17, 2020

Related U.S. Application Data

(63) Continuation of application No. 15/675,123, filed on Aug. 11, 2017, now Pat. No. 10,673,881.

(Continued)

(51) Int. Cl.
*H04L 9/40* (2022.01)
*H04L 45/00* (2022.01)
(Continued)

(52) U.S. Cl.
CPC .......... *H04L 63/1425* (2013.01); *H04L 45/20* (2013.01); *H04L 63/0227* (2013.01);
(Continued)

(58) Field of Classification Search
CPC . H04L 63/1425; H04L 63/0227; H04L 63/10; H04L 63/1441; H04L 45/20; H04L 45/02; H04L 45/48
See application file for complete search history.

(56) References Cited

U.S. PATENT DOCUMENTS 7,181,141 B1  2/2007 Kapur
8,411,684 B1  4/2013 Das et al.
(Continued)

FOREIGN PATENT DOCUMENTS

WO    2003060717 A1    7/2003

OTHER PUBLICATIONS

United States International Searching Authority; International Search Report and Written Opinoin for PCT/US2017/046633; dated Oct. 17, 2017; 13 pages; Alexandria, VA.

(Continued)

*Primary Examiner* — Nelson S. Giddins
(74) *Attorney, Agent, or Firm* — Kirk Dorius; Dorius Law PC

(57) ABSTRACT

A system and method of detecting an unauthorized access, phish attempt, or ransomware attempt based on limiting network transmission of data packets within an authorized device range. The method includes establishing a router hop limit value to predetermine an authorized device range for data packets to be exchanged between communicating pair devices and limiting transmission of data packets to within the predetermined authorized device range by discarding data packets after reaching the predetermined authorized device range as a function of the established hop limit value, to exclude devices beyond the predetermined authorized device range. Analyzer, Explorer, Setter, Modifier and Monitor Modules interoperate to suppress spurious communications from remote intruders.

10 Claims, 22 Drawing Sheets

Related U.S. Application Data

(60) Provisional application No. 62/373,429, filed on Aug. 11, 2016.

(51) Int. Cl.
  *H04L 45/02* (2022.01)
  *H04L 45/48* (2022.01)

(52) U.S. Cl.
  CPC .............. *H04L 63/10* (2013.01); *H04L 45/02* (2013.01); *H04L 45/48* (2013.01); *H04L 63/1441* (2013.01)

(56) References Cited

U.S. PATENT DOCUMENTS

| | | |
|---|---|---|
| 8,966,117 B1 | 3/2015 | Osburn, III |
| 2004/0018849 A1 | 1/2004 | Schiff |
| 2007/0025241 A1 | 2/2007 | Nadeau et al. |
| 2007/0280247 A1 | 12/2007 | Mera et al. |
| 2008/0113634 A1 | 5/2008 | Gates et al. |
| 2008/0267185 A1 | 10/2008 | Biskner |
| 2011/0184444 A1 | 7/2011 | Karstens |
| 2011/0194444 A1* | 8/2011 | Karstens ............... H04W 12/50 370/252 |
| 2013/0188562 A1* | 7/2013 | Espina Perez .......... H04L 47/14 370/328 |
| 2014/0185617 A1 | 7/2014 | Andre et al. |
| 2015/0256580 A1* | 9/2015 | Morton .............. H04N 21/6125 709/219 |

OTHER PUBLICATIONS

European Patent Office; Extended European Search Report for corresponding EP Application No. 17840381.2; dated Nov. 20, 2019; 13 pages; Munich, DE.

Wang et al.; Defense Against Spoofed IP Traffic using Hop-Count Filtering; IEEE/ACM Transactions on Networking, vol. 15, No. 1, Feb. 2007; US.

European Patent Office; Office Action for corresponding EP Application No. 17840381.2; dated Sep. 26, 2021; 7 pages; Munich, DE.

* cited by examiner

METHOD AND SYSTEM FOR LIMITING THE RANGE OF DATA TRANSMISSIONS

CROSS-REFERENCE TO RELATED APPLICATIONS

The present non-provisional application is a continuation of U.S. patent application Ser. No. 15/675,123 filed on Aug. 11, 2017, entitled "Method and System for Limiting the Range of Data Transmissions," which claims benefit under 35 U.S.C. § 119(e) from U.S. Provisional Patent Application Ser. No. 62/373,429, titled "Network Hop Sphere Security Management System", filed Aug. 11, 2016, the entire contents of each are incorporated herein by reference.

BACKGROUND

Field of the Invention

Embodiments of the invention generally relate to the field of data security, particularly to limiting communications between devices, for transmission of data.

Description of the Related Art

Time-to-live (TTL) and/or router HOPv fields are defined in Internet Protocol packet headers and establish how long a packet will persist in a network. During early development of Internet Protocols (IP), the Time-to-live fields were established at 30 or 60, initially to represent time values of 30 seconds or 60 seconds. Early implementations of Internet Protocol required each router in low-speed networks to calculate the amount of time it took to traverse a router and decrement that time element accordingly. As network communications became faster, with packets routed in under a thousandth of a second, the concept of a "hop" was adopted to indicate traversal of a router or other node.

"Hop" as used herein refers to the transiting of a packet through a router, node, or internetwork device.

Time-to-Live or "TTL" as used in IPv4 refers to either time decremented in seconds or; HOP—if less than one second.

"TTL/HOP" is used in IPv4 to refer to the time-to-live or HOP value.

"HOP" or "HOP Limit" under IPv6 refers to traversing of data packets through routers or other internetwork devices.

"Router" as used herein refers to any layer three device, server, firewall, load balancer, or other internetwork component that can decrement the HOP value while data packets traverse interfaces.

"HOPv" as used herein is a general description of any HOP value found in an IPv4 or IPv6 packet header.

"HOPvOSD" as used herein refers to a HOP value set by an Operating System Default, e.g., 30, 32, 60, or more commonly 64, 100, 128, 255.

"HOPvZR0" as used herein refers to a HOP value after fully decrementing across routers and expiring at zero, causing router packet discard and stopping communications.

"HOPvTRN" as used herein refers to a HOP value found in a packet hop field header transitioning either directional between source and destination peers.

"HOPvDST" as used herein refers to a HOP value in a packet at destination.

"HOPvMXR" as used herein refers to a Maximum hop count required to communicate with peers.

"HOPvEXC" as used herein refers to a number of excessive hops beyond those required to communicate with approved peers (HOPvOSD less HOPvMXR equals HOPvEXC).

"HOPcBTN" as used herein refers to a number of hops consumed between source and destination devices (HOPvOSD less HOPvDST equals HOPcBTN).

Routers decrement a HOP field in the IP header as data traverses a router or node acting as a router. HOP fields now represent many routers/nodes to be traversed along a network communication pathway, independent of time. For example, data packets sent in response to a "ping" from a network device indicate the HOPvDST remaining on the packets, e.g., HOPvDST=118 indicates 118 hops remaining for the packet before expiration. For this session the default value set by the operating system is HOPvOSD=128, minus the HOPvDST=118 equals hops consumed between HOPcBTN=10 leaving HOPvEXC=110 excessive hops beyond that required for this transaction.

The first application of hop limits began with Internet BGP routers. Internet RFC Experimental 3682 in 2004 obsoleted by RFC 5082 expiring in 2007 mentions checking TTL for security hijack spoofing and the use of protecting BGP functions using TTL listing other references as far back as the early 1990's. By lowering the default HOPvOSD=1 on BGP router communications to other routers, prevented distant devices from forming adjacencies. If a BGP router sends an adjacency packet, other routers could not route it because the HOP decrements to zero and the packet is discarded, limiting how far BGP packets can be sent due to HOP limit starvation. Multicast protocols IGMP and Simple Service Discovery protocols established in the 1990's or before also use this same effective technique. Applying multiple automated steps, in a feedback loop system of software functions, this Internet standard technique becomes a powerful security capability limiting transmission distance providing protection from dangerously high default HOPvOSD values found in most computer operating systems.

Computer networks and the broader Internet have thousands of routers, but the path between any two devices rarely exceeds 30 routers from end to end. Computer network operating system devices start HOPvOSD settings at a higher default hop value allowing packets to traverse the entire extent of the private network or public Internet. Microsoft's early implementations set this 8-bit wide field capable of decimal 0 through 255 hop values to HOPvOSD=32, allowing 32 hops between two devices. As networks grew in number of routers in the mid 1990's, the default setting was increased to 128 hops, HOPvOSD=128. UNIX derivatives set this value up to 255 maximum of HOPvOSD=255. Linux uses 64 as its HOPvOSD=64 value. The original purpose of the HOPv setting was to stop packets from looping around the private network or Internet indefinitely by causing routers to decrement the hop value as data traverses to the next link in the route and ultimately causing the final router/device to discard the expired data packet. Discarding a zero HOP count packet HOPvZR0=0 is helpful to prevent packets from looping indefinitely, as would happen occasionally as routes changed and as route topology caused packets to spin between a topology loop. The default HOP value exposes Internet connected devices to communication with billions more excessive devices than necessary during communications between appropriate peers.

Large HOP field values HOPvOSD result in excess hop range in the network topology to devices. Excessive HOPvEXC values potentially afford unduly remote access to a given device, e.g., by distant or overseas hackers. Default device HOPvOSD values may expose devices to unauthorized access well beyond an organization or beyond a necessary range of access. Sensitive devices are often locked down behind firewalls, to limit communications outside of the web-server. But, firewalls sometimes have vulnerabilities due to human error or other errors. A default Time-to-live TTL (referred to as Hop) HOPvOSD setting of 255 or even as low as 64 allows remote countries to communicate with sensitive servers. Accordingly, improvements are sought in improving security of devices and data accessible in security zones such as data centers via the Internet and internal users within large organizations.

SUMMARY

Systems and methods for managing the range of access to a device and the range of transmission of a data packet are described with reference to a "Hop Sphere Radius" management system and method. Various Hop Sphere Radius management systems and methods described herein provide automated discovery and analysis of actual values, testing and tailoring of hop limit "HOPvLMT" settings to better control the accessible range of a device across a network. "HOPvLMT" as used herein refers to Applying multiple automated steps, in a new HOP setting limit recommended by Hop Sphere Radius Security feedback loop system or components of software modules, this Internet-standard-based technique becomes a powerful security capability limiting transmission distance by providing protection from dangerously high default TTL/HOP values found in most computer operating systems. Manually setting thousands of devices to a more secure HOPvLMT value would be a cumbersome and wholly untimely time-consuming manual process, especially when network topology changes occur, the manual process would not be rapid enough to adjust to changes. Without an automated feedback system to analyze, discover, set, explore and monitor for changes and, wide use of HOPvLMT starvation, reducing the threat from billions of remote devices is not possible. The Hop Sphere Radius Security system, subsystems and various modules are configured to explore/test, learn, monitor and change HOP limit values to establish a more secure radius of communications for network-accessible devices.

This document discusses variations of the term "hop". Sometimes as an initial setting value in a TCP/IP device, sometimes as consumed hops between peers, sometimes as a value found at various points in a network. In IPv4, hop count is called TTL or HOP, in IPv6 it is only referred to as HOP. As used herein, the terms TTL, HOP or TTL/HOP may be used interchangeably. Other terms used herein are defined below:

"Hop Jitter" refers to variations in hops consumed between devices.

"Hop Sphere Radius System" includes interoperable modules described below:

"Analyzer" refers to functions and features use to gather hop statistics from the network.

"Explorer" refers to functions and features used to actively explore the network itself or through other devices.

"Setter"—refers to functions and features used to establish and set hop limit values and other network parameters.

"Modifier" refers to functions and features used to set hop limit values and network parameters on a device or multiple internetwork devices.

"Monitor" refers to functions and features used to listen to network transactions and monitor network topology.

"Consolidator" refers to functions and features used to tie system components together to create a feedback loop of continuous operation optimizing Hop Sphere Radius Security.

"HOP SPHERE RADIUS SECURITY" refers to use of a constrained security zones or "Spheres" through limiting the number of router hops allowed to the sphere boundary or "Radius".

A Hop Sphere Radius Management System may include various modules to explore a route between HOPcBTN two communicating pair devices, may derive the required HOPvLMT count, and modify Active Directory Group Policy, DHCP server option settings at a router, firewall, or other internetwork device to substantially limit HOP settings for communications within the range of an allowed communicating pair device(s). By applying limits to the HOP value for a device, or changing HOP values at ingress/egress locations such as at an Internet or Datacenter demark, an administrator can exert control over the communication range/distance for a device. Thus, a hop radius can be established to protect devices from attack by remote devices beyond a HOPvMXR value required for authorized communications. Limiting the hop radius can isolate sensitive devices and prevent contact or consummation of a data transfer session by two remote of devices.

Hop Sphere Radius security methods apply TCP/IP theory to protect Internet devices from long-distance attacks. TCP/IP devices have an IPv4 or IPv6 HOPv value setting represented as an 8-bit number in the HOP field of the Internet Protocol header. The HOP setting can be used to limit the number of router hops a packet can traverse between two communicating devices. Routers decrement HOP value as the packet traverses through routers and before expiring. When reaching zero it causes the expiring router to discard the packet. By lowering the value of the HOP setting in the packet header an administrator can limit the range/radius for device communications using TCP/IP routers over both the Internet and private networks.

Excessive HOPvOSD values can expose Internet-accessible or Datacenter devices to attacks from hackers well beyond the necessary or intended range of communication for the device. By tailoring the HOPvLMT values appropriately, only those within the range of the HOPvLMT value setting can access a device, greatly reducing the sphere of accessibility across private networks or the Internet. This security measure can greatly reduce the volume of potential attacks from billions of devices to just a few, and therefore reduce the volume of potential attacks and security resources required to protect the device.

Hop Sphere Radius security methods can reduce the potential for attacks on databases and other back-end devices that may not need to be accessible to the far reaches of the network or Internet. In fact, databases rarely if ever communicate directly with end devices as they are behind Web and Application servers. Web servers and other devices requiring direct connection may benefit from exploration of the possible connection spheres required to communicate with a target sphere or zone. For example, a web server of a local business or organization providing services to a limited local sphere has little need for communication with overseas devices. While firewalls restrict unauthorized access in most cases, Hop Sphere Radius security methods for managing HOPvLMT counts add a fundamental security measure that is effective even when a firewall fails. Devices on the inside of firewalls typically have few constraints on establishing connections with devices on the far side of the firewall. Most have full latitude to connect anywhere in the world for any purpose because they are trusted on the inside of the firewall to connect anywhere outside. By lowering the default HOP, HOPvLMT even though inside devices are free to communicate, setting a lower HOPvLMT value limits how far, and through how many router hops they may communicate, significantly lowering exposure.

Exploration of the hop metrics between two devices may include inspection of the starting HOPvOSD and ending HOPvDST values upon arrival of an actual packet, or by sending exploratory packets in one or both directions and inspecting the remaining HOPvTRN values. Through examination of the HOPvDST field value as a data packet arrives at a device, the system can accurately determine how many router hops the packet traversed en route from the originating device. By performing multiple exploratory packet transactions, the number of router hops required to communicate between HOPcBTN the source and the remote device can be closely estimated. This HOPv value estimate may be used to deny access beyond an authorized HOPv value count. This HOPvLMT value estimate may be used to tailor the radius of communications to encompass a communicating pair device to provide a more targeted sphere of potential clients and reduce attack potential beyond the hop radius.

Hop Sphere Radius System is a dynamic automated security system analyzing hops between communicating peers. Discovering the appropriate hops begins by discovering the hops already being used between communicating peers. Discovering the number of hops in use is performed through packet capture methods used to learn the hops already utilized by existing communicating peer pairs. An algorithm based upon communicating peer experience is used to dynamically discover hops and then set the hop limit value. The Hop value is more appropriately set in end stations using several automated software algorithms in distributed modules in a feedback loop configuration. Various methods of setting HOPvLMT count directly and indirectly on stations themselves or by using internetwork devices to change HOPv values dynamically can be used. For example, other modifying devices may include firewalls, proxies, load balancers, routers, optimizers and traffic shapers applying values provided in an automated fashion to accommodate occasional network changes. Monitoring of ICMP packets provides notice (containing headers from packet discards due to HOP going to zero) of undelivered packets to the destination. The information is used as feedback to the system initiating automated or administrative policy actions to adjust HOPv settings to prevent/approve devices from communicating and adjust HOPv to allow continued communications as needed.

Greatest benefit is achieved when a device itself allows HOPvLMT value setting configuration, becoming an independent End Point Firewall and limiting communications to the adjusted HOPvLMT value without other device dependencies such as a central firewall. Firewalls, meant to protect such devices, are themselves being compromised as primary targets and account for much of high-profile data loss. If a device can utilize intrinsic HOPvLMT value limits, it will remain protected from distant devices even if a traditional firewall is compromised. This also prevents distant devices from many-man-in-the-middle attacks from taking over communications of an existing session. Firewalls allow traffic to pass through while HOPvLMT limits constrain how far that data can travel.

Hop Sphere Radius security methods may be implemented in software or hardware modules within any number of devices, including intervening interconnection devices such as routers, firewalls, or other TCP/IP routing, security, load balancers or WAN optimization devices between any two nodes. Hop Sphere Radius security methods may be applied in software and appliance products such as router software modules, firewall software modules, load balancers and inside the device protocol stack software itself. Some parts of Hop Sphere Radius security methods may be optionally applied manually based upon manual analysis and exploration steps. In some limited cases, HOPvLMT settings may be accomplished manually using recommendations from the system on an individual device basis. Because the manual practice is static, while network environments are dynamic and hop change can occur randomly, manual configuration is decidedly slower and inadequate in a rapidly changing network environment. However, automated analysis, monitoring, change detection and value setting in a feedback loop can accommodate hop changes in a dynamic network. An automated solution is needed to track changes in Hop Jitter, monitor ICMP HOP expiration packets and detect packets with higher than allowed HOP values. Effective implementation of the automated system with a continuous feedback loop as described herein offers significantly improved security of data and networks to modern reliability standards.

In some embodiments, as the HOPvTRN count is decremented and as the packet expires to a value of HOPvZR0, routing devices may send Internet Control Message Protocol (ICMP) messages to the original sending device notifying that a packet expired and was discarded at the router. The software using intervening device logic can determine/learn the minimum HOPvDST count required to communicate with distant devices using exploratory packets. After learning a target device range, the HOP settings can be set on the relevant devices to limit the radius of communications to an acceptable HOPvLMT to limit the number of devices having access and thereby reduce attack surface. In some embodiments, a Hop Sphere Radius software agent running inside the endpoint device itself can thereby detect the packet discards and adjust the setting subject to policy limitation settings. The system is capable of running as a distributed system or inside one device.

In some embodiments, software can be used to determine the geographical location of a communicating pair device. Geolocation helps determine an appropriate targeted communications hop sphere radius required or defined for communication with the pair device. For instance, if a device is intended to communicate only within the general New York metropolitan region, limiting the number of hops based on geolocation of regional nodes will allow the device to serve the target region but disable communication with devices in more remote regions or security zones. Disallowing distant devices by HOPvLTM value protects and lowers the attack surface of devices in both directions. Geographical limitations applied by many firewalls will be more effective when the device itself or the Modifier uses HOPvLMT value Hop limits to limit communications. Firewalls allow traffic to pass through while HOPvLMT limits constrain the distance that data can travel.

With TCP/IP, a bidirectional communications TCP three-way handshake (SYN-SYN-ACK) is required to consummate a communications session for bidirectional data exchange. If the three-way handshake or even one direction of the handshake has the HOPvLMT count sufficiently limited, the session will not be consummated and the device is thereby protected. Thus, the device is limited to communications within the sphere of its radius of communications allowed by its HOP value. TCP fingerprinting can be used to determine the OS, and estimate original HOP. The algorithm uses the fingerprint of the device to determine the starting HOP based on the most common Hop settings of 255, 128, 100, and 64 for the system discovered. Using the operating system TCP option values, starting IP ID's, and starting Sequence ranges in the Syn packets many operating systems HOPvOSD default settings can be determined by examining session packet values with the Analyzer 502.

These Hop Sphere Radius security methods and techniques have application for both outgoing and incoming session protection. For example, a device with a HOPvOSD count of 255 can go through 255 routers to reach its destination, reaching virtually anywhere on the Internet. Starting from a default HOPvLMT value of 255, if a device in China could connect to a device in the United States with 25 HOPs HOPcBTN=25, it would have 230 HOPvEXC=230 remaining. If the device in the United States has a HOPvOSD=128 setting of 128 and responds, the three-way handshake will consummate the connection and be able to exchange data. Should, however, the HOP of the device in the United States be limited to 15 HOPvLMT=15, the request from China would make the trip to the US device, but the US device would reply with a limited HOPvLMT=15 such that router 15 en route to China will expire the data packet at HOPvZR0=0 value and discard the packet. Thus, the device in China is denied a data exchange opportunity by starving the HOPvLMT field of enough hops to traverse the number of routers required to consummate the transaction. This limits the transmission distance of the device from billions of devices to as little as a few.

Hop Sphere Radius security methods drastically reduce the volume of nuisance attacks and real attacks on devices around the world. This, in effect, reduces the amount of investigatory work and cost of analyzing such attempts from around the world to within the device's communications Hop Sphere. If a United States device was to become infected through a software update or other exploit designed to provide access by a device in a remote country, a more restrictive HOPvLMT setting would effectively deny data harvesting by the remote device. In the event of an attack from a node within an authorized HOPvLMT radius, it would also likely be easier for local authorities to intervene. If the Hop Sphere is limited to nodes within a nation or locality such as the United States, in the event of a persistent attack or breach, it can be determined that the perpetrators are within US jurisdiction and a warrant can be obtained to identify and catch the perpetrators and potentially recover information or mitigate distribution. Communicating with peers outside a device's regional localities laws may be beyond the Rule of Law, making it difficult to prosecute, mitigate or prevent future attacks.

Using results of the hop remainder HOPvDST for various peer IP addresses of a device, an Internet Geo IP geographical location database or online system may be used to determine the location of relevant IP addresses and to confine communications to within a more appropriate local sphere. Exploratory packet transactions may be used to discover the Hop Sphere geography for a given HOPvLMT value setting.

Hop Sphere Radius security methods can also be used to limit communications to within an organization. For example, the ability to set the HOPvLMT value with DHCP option Default IP Time-To-Live TTL Code 23 settings for various nodes can be used to limit communications to within a parent organization. Internal lists of IP addresses can be used to tailor communications spheres of relevant devices. Routers implementing Hop Sphere Radius security methods can include a discovery and lookup table to set a device's communication's radius sphere. Such a lookup can selectively protect an organization's devices according to their appropriate purpose and limiting a devices Internet or private network communications sphere behavior.

The Hop Sphere Radius Management System helps prevent devices from communicating outside of the sphere appropriate for that individual device. For example, the hop sphere may be used to limit communications only to the segment itself using a HOPvLMT=1 count of one, only to VPN sphere users at hops between of HOPvLMT=3 three, or to internal organization-wide users at hops between of five HOPvLMT=5. Hop Sphere management may be applied to limit access to remote Internet devices limiting packets to a specific number of hops into the Internet to allow perhaps the primary Internet Service Provider (ISP) access, e.g., a hop count of 6 HOPvLMT=6 six, or loosely a region or nation based upon using a certain radius of hops from its location. The HOPv setting on any device may be set to limit communications within the number of appropriate HOPvLMT value chosen for a device or group of devices. The IP limited distance packets expire when the set number of hops have been decremented as packets traverse routers reaching HOPvZR0=0.

Accordingly, using automated Hop Sphere Radius security methods, organizations can substantially tailor the range of access to a given device and the corresponding range for transmission of sensitive data. Additionally, valuable security resources can be conserved by obviating high volumes of attack from remote locations around the globe and reducing Internet traffic for such attacks.

One aspect of the invention features, in some embodiments, a method of limiting network transmission of data packets within an authorized device range. The method includes capturing data packet header information from data packets exchanged between communicating pair devices over time; and determining from the data packet header information a range of router hop counts and a maximum router hop count required for communications between the communicating pair devices over time. The method includes establishing a router hop limit value for data packets to be exchanged between the communicating pair devices, wherein the router hop limit value meets or minimally exceeds the determined maximum router hop count to substantially limit transmission of data packets within a predetermined authorized device range.

In some embodiments, determining the range of router hop counts required for communications further includes determining hop jitter caused by network topology changes between the communicating pair devices over time.

In some embodiments, the method includes determining a transit time for communications between the communicating pair devices and validating an ICMP hop count expiration notice using the determined transit time.

In some embodiments, the method includes monitoring ICMP hop count expiration notices and detecting one of VPN tunneling and an attempt to exceed an established router hop limit value by comparison of the determined transit time and a historically observed transit time for communications between the communicating pair devices.

Another aspect of the invention features, in some embodiments, a method of limiting network transmission of data packets within an authorized device range. The method includes transmitting one or more exploratory data packets along a communications pathway between an originating device and a remote device; determining a number of internetwork devices traversed by the exploratory data packet along the communications pathway; and establishing at the originating device a hop count limit value for a data packet to be sent from the originating device to the remote device; wherein the hop count limit value is selected to substantially limit transmission of the data packet to within a defined hop radius boundary.

In some embodiments, the hop count limit value is established to limit data transmission to within a geographic region.

In some embodiments, the hop count value is established at fewer than 20 percent beyond the estimated number of internetwork devices traversed along the communications pathway.

In some embodiments, the method includes detecting potential security breaches by monitoring ICMP hop count value expiration notices.

In some embodiments, the method includes updating a hop count limit value to accommodate an allowable change in network topology.

In some embodiments, the hop count limit value is established based on hop metrics determined by analyzing prior communications between communicating pair devices.

Another aspect of the invention features, in some embodiments, a system for real-time control of transmission of data packets. The system includes an explorer module configured to exchange exploratory data packets with a remote device; an analyzer module configured to analyze hop metrics from internetwork devices for the exploratory data packets to determine a number of internetwork devices traversed in exchanging the exploratory data packets; a monitor module configured to listen to network events and report on ICMP messages and hop count expiration notices from internetwork devices; a settings module configured to establish hop limit values to substantially correspond to an estimated number of internetwork devices to be traversed for communication with the remote device; and a modifier module configured to modify data packet headers with the established hop limit values.

In some embodiments, the modifier module is implemented within an internetwork device.

In some embodiments, the settings module is configured to establish a hop limit value to substantially limit data packet transmission to a defined radius within a network.

In some embodiments, the settings module is configured to use hop metrics obtained from the analyzer module and explorer module regarding a respective communicating device pair to establish a respective hop limit value.

In some embodiments, at least one of the analyzer module and monitor module is configured to monitor session establishment and notifies of failure to establish a session due to hop limit enforcement.

In some embodiments, the analyzer module is configured to monitor hop jitter statistics for communicating peers.

In some embodiments, the monitor module is configured to monitor packet expiration notices to detect when an updated hop limit value is needed to optionally accommodate a change in network topology.

In some embodiments, the system includes a reporter module configured to log data packet transmission metrics including respective hop metrics providing custom query reports, automatically generating reports about hop metrics and system operation events, system assets and configuration.

In some embodiments, the explorer module is configured to actively probe a network to determine network topology surrounding one IP addressed device.

In some embodiments, the setter module is configured to set operating system hop value limits on devices using at least one of direct login, DHCP, and Active Directory In some embodiments, the setter module is configured to instruct an internetwork device to override Hop count values as data packets traverse the internetwork device.

Another aspect of the invention features, in some embodiments, a computer readable storage medium storing machine readable instructions which, when executed by a machine, cause the machine to: capture data packet header information from data packets exchanged between communicating pair devices over time; determine from the data packet header information a range of router hop counts and a maximum router hop count required for communications between the communicating pair devices over time; and establish a router hop limit value for data packets to be exchanged between the communicating pair devices, wherein the router hop limit value meets or minimally exceeds the determined maximum router hop count to substantially limit transmission of data packets within a predetermined authorized device range.

DETAILED DESCRIPTION OF THE INVENTION

Figure 1:
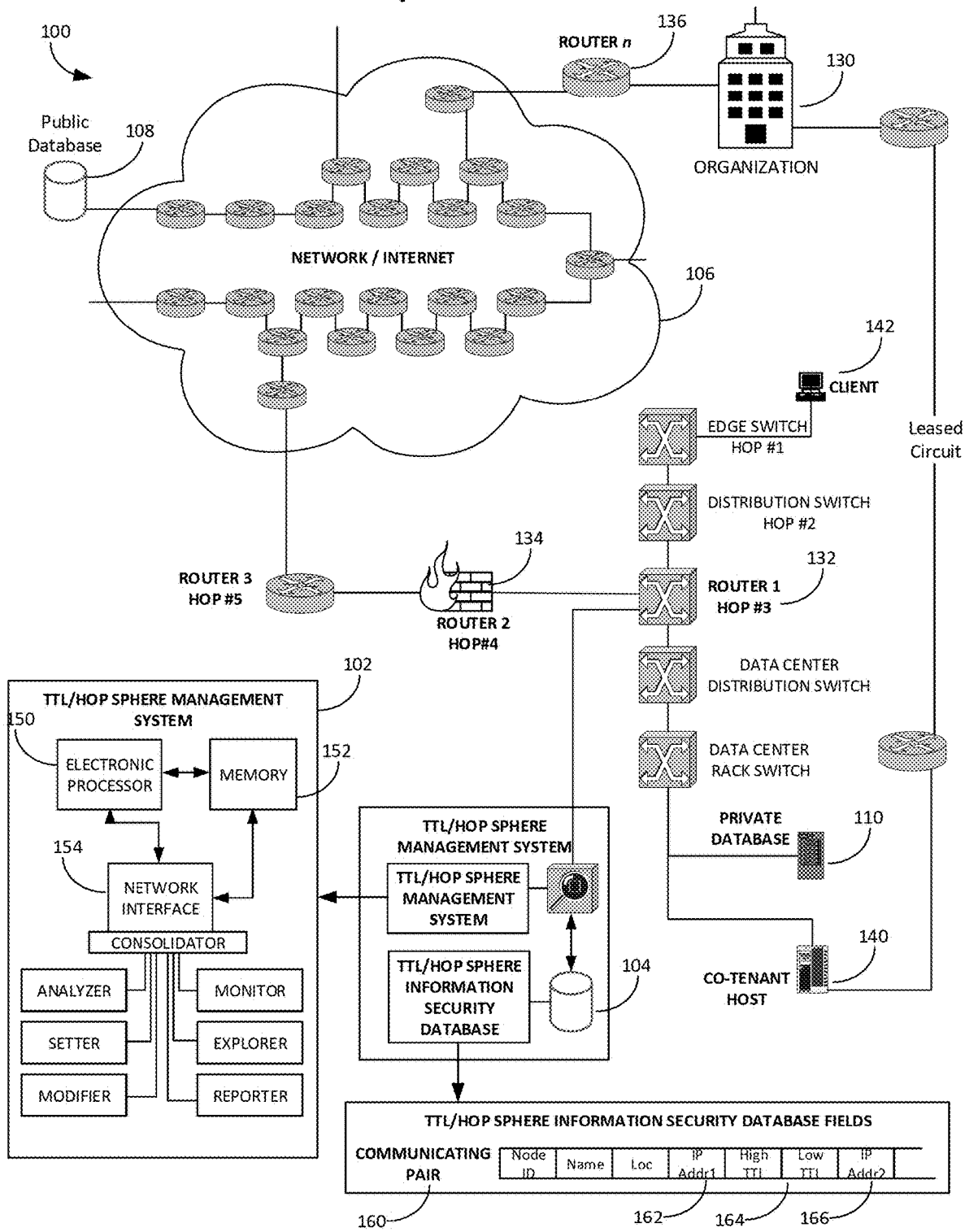
FIG. 1 is a diagram of an INTERNET PROTOCOL HOP SPHERE RADIUS MANAGEMENT SYSTEM coupled to a HOP SPHERE INFORMATION SECURITY DATABASE for managing access and communications ranges for devices over a network, according to some embodiments.

Reference in this specification to "one embodiment" or "an embodiment" is intended to indicate that a feature, structure, or characteristic described in connection with the embodiment is included in at least an embodiment of the invention. The appearances of the phrase "in one embodiment" or "an embodiment" in various places in the specification are not necessarily all referring to the same embodiment. Furthermore, the phraseology and terminology used herein is for description and should not be regarded as limiting. For example, "including," "comprising," or "having," and variations thereof, as used herein are meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings, and can include electrical connections or couplings, whether direct or indirect.

It is to be understood that the invention is not limited in its application to the details of construction and the arrangement of components set forth in the following description or illustrated in the accompanying drawings. Rather, the following description is intended to provide a convenient illustration for implementing various embodiments of the invention. As will become apparent, various changes may be made in the function and arrangement of the elements or steps described in these embodiments without departing from the scope of the invention as set forth herein. Embodiments of the description herein may be adapted to be employed with any number of different networks, databases, applications, registries, software configurations and the like and still fall within the scope of the present invention. Thus, the detailed description herein is presented for purposes of illustration only and not of limitation.

A plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware or solely in software. Embodiments of the invention may also be described herein in terms of functional and/or logical block components and various processing steps. However, one of ordinary skill in the art, and based on a reading of this detailed description, would recognize that, in at least one embodiment, such block components and electronic-based aspects of the invention may be implemented in software (for example, stored on non-transitory computer-readable medium) executable by one or more electronic processors, firmware, hardware components, or some combination thereof. Accordingly, a plurality of hardware and software based devices, as well as a plurality of different structural components may be utilized to implement the invention.

Embodiments of the invention may employ various integrated circuit components, e.g., memory elements, digital signal processing elements, logic elements, look-up tables, or the like, which may carry out a variety of functions under the control of one or more electronic microprocessors or other controllers or control devices. "Controllers" or "processors" described herein can include processing components, such as one or more electronic processors (e.g., microprocessors, digital signal processors (DSPs), field programmable gate arrays (FPGAs), application specific integrated circuits (ASICs), and the like), non-transitory computer-readable memory modules, input/output interfaces, and various connections (e.g., a system bus) connecting the components. For the sake of brevity, conventional techniques related to signal processing, data transmission, network control, and other such functional aspects of the systems (and the individual operating components of the systems) may not be described in detail herein. Electronic communications and notifications may be performed using any known means including direct connections, wireless connections, and the like.

FIG. 1 schematically illustrates one exemplary embodiment of a Hop Sphere Radius Management System 100. The system 100 includes an Internet Protocol Hop Sphere Management System 102 and a Hop Sphere Security Database 104. System 100 interfaces over a network 106 with various organizational devices 130 and/or client devices 142, such as a public database 108, or a private database 110.

The network 106 may be a wired or wireless network, operating according to suitable internet protocols (e.g., Transmission Control Protocol (TCP), Internet Protocol (IP), and User Datagram Protocol (UDP)). The terms "internet protocol" and "internet protocols," as used herein, may refer to Internet Protocol version 4 (IPv4), Internet Protocol version 6 (IPv6), future-developed internet protocols, or some combination of the foregoing. All or parts of the network 106 may be implemented using one or more existing networks, for example, a cellular network, the Internet, a land mobile radio (LMR) network, a short-range (for example, Bluetooth™) wireless network, a wired or wireless wide area network (WAN), a wired or wireless local area network (e.g., Wi-Fi or Ethernet), and a public switched telephone network (PSTN). The network 106 may also include future-developed networks. In some embodiments, communications with other internal or external devices (not shown) occurs over the network 106.

As illustrated, the network 106 provides connectivity to an organization 130, which represents any number of network accessible devices within an organization, e.g., [databases, routers, firewalls, servers, user computers and other data control devices]. Such organizations may be a business, a service provider, a government entity, or any other organization that provides or uses network-connected devices or services. The network-connected devices or services utilize network nodes or routers (1 through n) 132, 134, 136 to exchange data within the organization or with client devices or other remote devices.

Some devices may be connected to the network 106 through a connection shared by the organization 130. Other devices may be connected directly to the network 106. Still other devices may be part of a system 100 or device shared by the organization 130 and others (e.g., the co-tenant host 140). The network assets may be used internally by the organization, may be accessed by members of the public via the network 106, or may be used to provide hosted data or services to a client 142. A client may be another organization or an individual and represents any number of network accessible devices within a client organization, e.g., servers, client computers, or other human interface device.

In the embodiment illustrated, the Internet Protocol Hop Sphere Management System 102 includes an electronic processor 150 (for example, a microprocessor, or other electronic controller), a memory 152, and a network interface 154. The electronic processor 150, the memory 152, the network interface 154, as well as other various modules (not shown) are coupled, by one or more control or data buses or a combination thereof. The memory 152 may include read-only memory (ROM), random access memory (RAM), other non-transitory computer-readable media, or a combination thereof. The electronic processor 150 is configured to retrieve instructions and data from the memory 152 and execute, among other things, instructions to perform the methods described herein. The electronic processor 150 communicates, via the network interface 154, with the Hop Sphere Security Database 104, network routers 132, 134, 136, organizational devices 130, client devices 142 and other network-accessible devices using suitable network protocols.

The Internet Protocol Hop Sphere Management System 102 is communicatively coupled to the Hop Sphere Security Database 104, which electronically stores information regarding network assets such as communicating peer/pair devices in a relational database (e.g., a MySQL database). The Hop Sphere Security Database 104 includes records for storing information regarding, e.g., various communicating peer/pair devices 160, an originating device 162, a requesting device 166, and a test packet TTL/HOP. For example, Database 104 may include records about the HOP count for experimental packets exchanged between devices 162 and 166. These records may be used to tailor a HOP setting for other data exchanged between devices 162 and 166, or between devices with similar geolocations based on IP addresses. The Internet Protocol Hop Sphere Management System 102 reads and writes such information to and from the Hop Sphere Security Database 104, which database may be housed on a suitable database server (not shown); integrated with, or internal to, the Internet Protocol Hop Sphere Management System 102; or external to the Internet Protocol Hop Sphere Management System 102 and accessible over the network 106. Communicating pair devices may be found entirely within an organization, split between an organization and a client or generally accessible over the Internet.

The public database 108 is a database, which is available publicly over the network 106, which database may contain information regarding networks, customers, property, civil government content or other publicly available information. Examples of a public database include a domain name server, a WHOIS server, an IP address numbering authority server, a GeoIP database of IP address to map location, a public domain software repository, a government forms site and the like. The private database 110 is a database, which is available over the network 106 only to registered users. The private database 110 may contain similar data as the public database 108, and it may also contain proprietary data regarding the organization, customers, or user accounts.

Figure 2:
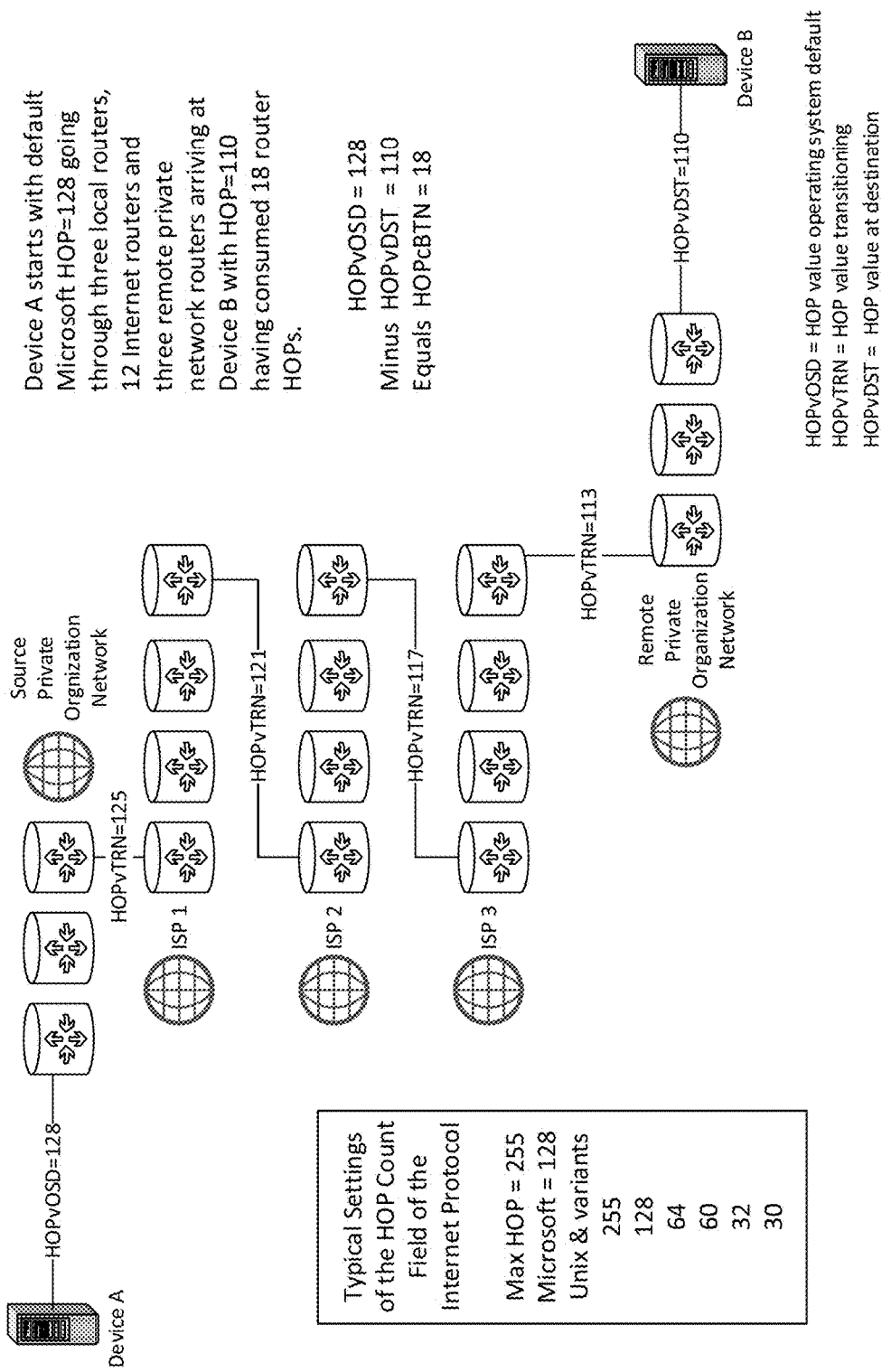
FIG. 2 is a diagram of a default PRIOR ART Internet Protocol time-to-live (TTL) or HOP setting and handling for data transmission in which the default HOPvOSD setting far exceeds the router HOPvEXC required to complete HOPvDST transmission.

With reference to FIG. 2, a typical default PRIOR ART HOP value device setting allows for unrestricted access and unrestricted device communications to the full extent of the default HOPvOSD device setting, e.g., Microsoft default of HOPvOSD=128. In this scenario, data originating at Device A can traverse three local routers of a source organization network, 12 Internet routers, and three more private routers in a remote organization network to arrive at Device B. Upon arrival, the data packet headers would include a HOP value remaining of HOPvDST=110, having been decremented by 18 intervening hops HOPcBTN=18 through routers/devices. Such a high residual HOP value HOPvEXC=110 could allow the requested data to circle the globe, or at least reach remote devices controlled by individuals beyond the reach of law enforcement. Excessive initial HOPvEXC settings represent a data security deficiency with potentially significant liability to an organization in the event of a remote hack of a database with sensitive organizational data or user account data. Such HOP value and network security procedures at the internal enterprise or service provider level can present significant risks to an organization and its clients.

Figure 3:
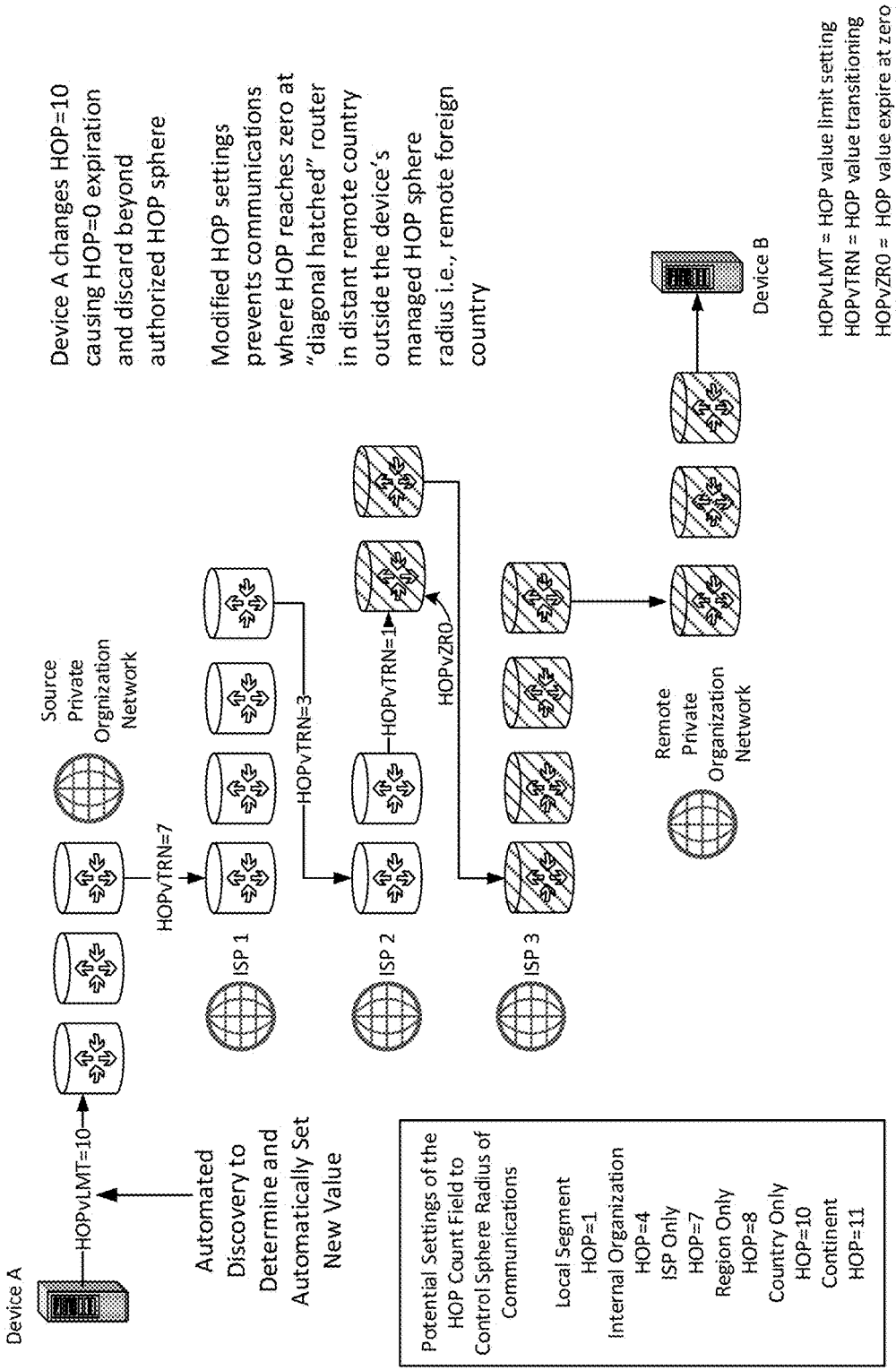
FIG. 3 is a diagram of an Internet Protocol time-to-live (TTL)/HOPv setting tailored to HOPvLMT limit data transmission geographically to a predetermined router hop radius, according to some embodiments.

Determining Appropriate IP Hop Spheres for Highly Sensitive Devices within Internal Networks and Over the External Internet With reference to FIG. 3, operation of a Hop Sphere Radius security management system is illustrated according to one embodiment in which the HOPvLMT Count Field setting is selectable between 1 and 11. The HOP Count Field Table shows examples of field counts corresponding to ranges selected by an administrator. For example, a HOPvLMT=1 may limit communications to a local segment of a network. A HOPvLMT=4 may limit communications to a local network within an organization. A HOPvLMT=7 may limit communications within an internet service provider (ISP). A HOPvLMT=8 may limit communications within a region, e.g., within the Northeast or Midwestern states. A HOPvLMT=10 may limit communications within a larger region or country, e.g., within the United States or Europe. A HOPvLMT=11 may limit communications within a continent, e.g., within North America or Australia. The HOPv values in these examples are representative, not specific or assured. Exceptions to these rules apply to some locations and situations where hops are hidden inside a VPN tunnel or in some cloud environments.

Figure 4:
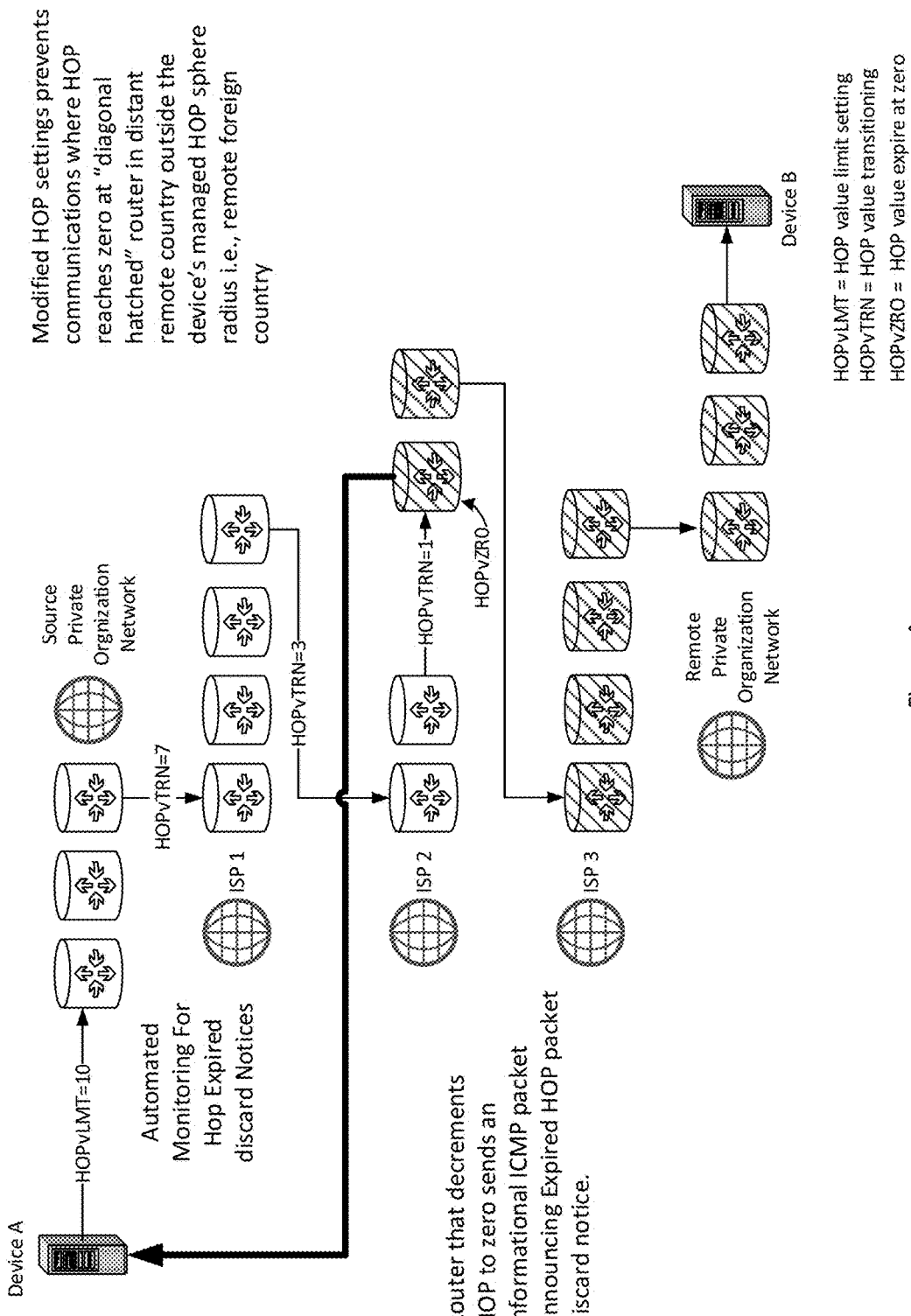
FIG. 4 is a diagram of an Internet Protocol time-to-live (TTL)/HOPv setting tailored to discard expired data packets HOPvZR0=0 and provide an ICMP Notification upon reaching a predetermined router hop radius, according to some embodiments.

With reference to FIG. 4, in the illustrated example, the HOP count is set at 10 to prevent access HOPvLMT=10 to a device or communications of data packets beyond the respective boundaries of a country's network. Each successive node/device decrements the HOP field value by one until the value reaches zero, at which point the last network device discards the relevant data packet. Each of the shaded devices downstream of HOPvTRN=1 will be unable to receive the data packets and thus denied access to Device A.

This tailored HOPvLMT=10 count value effectively prevents communications beyond the selected Hop sphere radius.

Some devices are hyper-sensitive to hacking or contain such valuable data that extreme controls may be required. Adequately securing devices of this type is equivalent to removing the devices from the network. However, those devices may require supporting systems to facilitate required operation. In this case, the device must have access to the network but should have limited access to other networks. Determining an appropriate range for a particular server may include probing the range of the network segment to which it is attached, i.e., determining the range of local devices that may need to connect with the server over that segment. This methodology may include accommodating the constraints of local communications to the device(s) on the local segment; but preventing a route off the local segment. Protecting devices should not isolate from other dependencies and supporting devices. Keeping the device from communicating beyond the segment can be accomplished by allowing local systems to communicate with only devices attached to the segment. Other devices inside a Hop Sphere zone may need to be placed on the same segment to support storage, time sync, security authorization and backup. This equates to an unconnected network of special devices allowed only to communicate with one another inside the zone. By setting the Time-to-live to 1, HOPvLMT=1 the Hop sphere management system will prevent communications to any devices not on the same segment. Data packets will not route through a firewall or through a router as the Time-to-live or HOPv is fully decremented down to HOPvZR0=0. The first application of HOPvLMT limits began with Internet BGP routers. By lowering the default HOPvLMT=1 on BGP routers, it prevented communications with distant devices to form adjacencies. If a BGP router sends an adjacency packet, other routers could not route it because the HOP decrements to zero and the packet is discarded, limiting how far BGP packets can be sent due to HOPvLMT starvation. Multicast protocols IGMP and Simple Service Discovery protocols established in the 1990's also use this same effective technique.

In some security zone scenarios, the HOPvLMT count may be strictly limited to internal users, e.g., to prevent communications to VPN users. For examples, if a data center had the VPN client concentrator on its segment(s) such that the HOPvLMT=3 count to VPN users was 3, access may be limited to not allow VPN users access to sensitive devices or sensitive servers by setting the Time-to-live TTL or HOP at 2. Thus, a critically sensitive data server would not be accessible to internal VPN users who have a HOP count of 3, but it would still be able to access other servers, for instance, only inside the data center, network time servers, and other types of active directory servers in the data center. The sensitive server still needs to communicate with other supporting servers, security access servers, and the data center. A HOPvLMT=2 count setting of 2 may provide sufficient number of hops to all those devices, but may not allow it to communicate beyond that data center where a HOPvLMT=3 count of 3 or more would be required. Hop Sphere Radius Security's automated Analyzer 502 gathers HOPvBTN count variations ("Hop Jitter") from which settings can be made to allow or deny traffic to more distant systems. Monitoring of ICMP events by Monitor 506 reports packet discards due to HOPvZR0 reaching zero provide feedback when changes prevent packet delivery beyond the existing HOPvLMT setting. System policy algorithms guiding automated settings may apply a HOPvLMT change or deny communications or move the event to administrative approval queue for human intervention or security event reporting.

In another example, a HOP count of 5 may HOPvLMT=5 enable local communications within an organization, e.g., to internal and VPN users. To access any internal company user, a HOP count of HOPvLMT=5 may accommodate internal communications, but a HOPvLMT=6 count of 6 or more may also allow data packets to go out to the internet, which is first connected to the ISP. In another example, if the ISP has a HOPvLMT=8 count of 8, internal communications into an ISP for DNS or other services, can limit access to a sensitive server with a HOP count setting of 8. Precise HOPvLMT settings in stable internal networks can add security to protect high value data.

In another example, to allow communications only to a region, the HOPvLMT=10 count can be set at 10. To reach some international locations but not others, the HOP count may be set at 12. Setting a HOPvLMT=12 count of 12 may limit the radius of communications of the sensitive device to close-by nations. For example, a HOP count setting of 12 may allow data to reach Europe, but may not reach deep into Asia, or Eurasia, or places where the HOPcBTN count is greater than 12. Thus, reducing the Hop Sphere or HOP from the typical defaults of 64, 100, 128, or even 255, can greatly limit a potential attack surface for a given device or organization.

Modifying the host HOP count can increase security for any size of organization. A device HOPvLMT setting can factor in any number of network and organization needs, but need not be larger than required to communicate with approved peers. For example, sensitive servers should not have unlimited access to or from any node on the internet.

In a Software Defined Network (SDN) or cloud provider like Amazon or Microsoft any one or collection of HOP Sphere Radius functions or modules could be added to limit SDN zones or spheres benefitting from one or more of the module functions. Many vendors allow third party software functions inside routers, switches, load balancers, VPN concentrators, firewalls and other internetwork equipment, either in hardware or software. Protecting cloud and hybrid private environments is accomplished by creating zones of spheres.

Restricting Internal Network Access to Authorized Internal Users for Highly Sensitive Devices Determining an appropriate HOPvLMT setting value can include complex factors and elements. For example, a sensitive database may only need to be accessible by a web-server, the web-server on a secondary network interface used only for internal communications. Web servers are out front connecting to users while the database provides bulk data to the web server, which communicates out to the users. A hacker or thief may be able to compromise a web-server but may still be prevented from getting back to the sensitive server. In some embodiments, databases and data repositories storing the most sensitive data in bulk should be more robustly protected and secured. Access to a sensitive database may thus be selectively enabled to VPN users within an organization's network or to users distributed across a network. Setting lower HOPvLMT values at the database prevents the database from unlimited transmission distance. If there are only 3 routers in the datacenter, then a HOPvLMT=3 will prevent databases from communicating outside the datacenter, providing a significant additional layer of data security.

To lock down extremely sensitive data, a device may be set to operate only on the segment on which it is placed, and on that same segment would be the web-server connection to it. Thereby, only allowing communications to exist directly from the sensitive device to the web-server. The sensitive device database could not otherwise connect to anything else unless it was attached to that device. By setting the HOPvLMT=1 value to one (1), external network communications are prevented for that device. Thus, if it is plugged into the same Ethernet switch and is on the same VLAN, then that device may communicate only with the web-server, but it may not communicate with anything else. It may be desirable to lock-down communications to a given server to access only a network segment and place anyone who needs to communicate with that device on that segment as well, to protect the sensitive device from exposure outside. In some embodiments, administrators may lock-down sensitive devices, including VPN users who exceed the HOP count.

Outgoing External Hop Threats

In some embodiments, administrators may set the HOPvLMT count on outgoing connections for a "sensitive device" that contains databases, e.g., credit card information, health information, privacy information, trade secrets, or classified information. The Hop Sphere Radius management system addresses the problem of the device itself communicating beyond its appropriate sphere by limiting the HOP count to the appropriate number of routers that the packets can go through. To keep access to a "sensitive device" limited to inside an institution, HOP settings can be used to prevent communications beyond the appropriate "home segment". When HOP Jitter occurs, e.g., due to changing network topology, the system operating in a closed feedback loop may automatically adjust or refer to administrative adjustment or security event reporting. HOPvLMT settings determine the distance, while firewalls control access. Working together, firewalls and HOPvLMT settings in a feedback loop achieve access with distance controls, something firewalls alone cannot provide.

In some embodiments, the HOP count value is modified by an API placed in a firewall, router, or other appliance. For example, a Hop Modifier 510 may be included inside a firewall as an agent to set a sensitive data packet HOPvLMT=8 value to 8 HOPs. Once the sensitive device data traverses 8 routers, the HOPv is decremented to zero HOPvZR0=0 and that packet is summarily discarded by that router. When a packet is discarded at HOPvZR0 an ICMP (internet control message protocol) message may be sent back to the sending device to notify that the packet was discarded. The message may also carry as a payload, a copy of the original IP header and part of the TCP header to identify which packet was discarded. Thus, the system may protect a device from communicating too far outside an organization, and the system is notified if a packet HOPvZR0 expires being seen by the Monitor 506 when the packet is discarded.

Firewalls are breached by determined, skilled hackers with increasingly sophisticated tools. It may be desirable to limit the transmission distance of the most valuable information or financially sensitive information of an organization, i.e., to prevent communication to overseas in the event of breach of a firewall. Limiting the Hop sphere of a given node ensures that the node does not communicate beyond a reasonable sphere or zone's distance. Hop Sphere security management systems automated dynamic methods may be applied to any number of devices.

Preventing Virus Infections and Trojans Exporting Sensitive Data to External Servers Sometimes the operating system or software or other systems are infected through a computer virus or malicious code. Operating system updates or other software updates are often vectors for computer viruses, many of which are "Trojans" and attempt to send data outside an organization, or connect to other devices to propagate the virus. Such viruses may seek to communicate outside to a remote hacker server or remote data harvester. If a device were compromised by viral software, attempts to connect to a remote node may be stopped when the distance set by HOPvLMT count expires before arriving at the hacker server. The sensitive device is prevented from depositing sensitive data in a hacker server because on the way back to the hacker server the HOPvZR0 expires on the packet and is not allowed to go through additional router hops. If a protected, sensitive device's software is corrupted, device communications are not consummated with a remote hacker server. Devices inside a firewall's trusted zone are granted the ability to connect with any device on the outside of the firewall. This trust, if infected with a Trojan virus can be exploited allowing external connection with any global device beyond the rule of law. When HOPvLMT settings limit the distance of allowed communications, Hop Sphere Radius Security denies connection to millions of networks and billions of devices, while still allowing more reasonable regional communications.

Hop Sphere Radius Security Management System

In general, the Hop Sphere Radius Security Management System enables administrators to limit incoming Internal/Internet attack exposure/disclosure/malware/virus propagation transmission distance beyond the Hop Sphere selected. The system may also limit outgoing Internal/Internet attack exposure/disclosure/malware/virus propagation beyond the Hop Sphere selected. In an example, the system may isolate malware-infected devices to prevent contact with hacker devices outside the Hop Sphere selected. In some embodiments, system policies may automatically protect groups of devices when Internetwork devices are enabled to set and modify the HOP by a Hop Modifier 510. Hop Sphere Radius Modifiers 510 are devices programmed to change the HOPvLMT count of certain IP address devices as they transit. This method is used when discrete devices cannot themselves be modified to set a new default HOP value. Modifiers 510 can also act upon the source and or destination address to set a value appropriate for a destination, protecting more specifically by peer device and other granular protocol filters.

In some embodiments, reducing the hop radius lowers security risks and the volume of potential internal attacks from devices beyond the hop sphere selected for a highly sensitive device. Reducing the hop radius lowers security risks and the volume of nuisance attacks from devices beyond the hop sphere selected for a highly sensitive device. Internet of Things (IOT) devices with poor or limited security may receive new more appropriate HOPvLMT values to keep them sequestered inside a safer zone of communications.

Unlike a web server, a database server may not need to be on the Internet. A web server is hardened and is purposed for being internet-facing and is generally protected by firewalls. A database may not be internet-facing and may need greater protection from the potential to communicate outside a limited hop sphere. If a web server is compromised, it may compromise small amounts of data at a time for one account. Whereas if a database server is compromised, it may allow bulk transfer of valuable information stored by an organization. Such databases and other backend systems may not be hardened or adequately secured against attack, but a restricted HOP count can prevent bulk transfer of sensitive information beyond the desired hop sphere.

Web servers that serve users only in one region of one country are still vulnerable to attack by any device globally, such devices can reduce its attack surface by lowering its HOP and lower the number of Internet devices capable of consummating TCP/IP sessions to enable data transmission between devices. HOPvLMT limits deny full bi-directional access so the device has fewer devices that can exploit unauthorized access even if a firewall or other security fails, it simply cannot communicate beyond its configured hop Sphere.

Figure 5A:
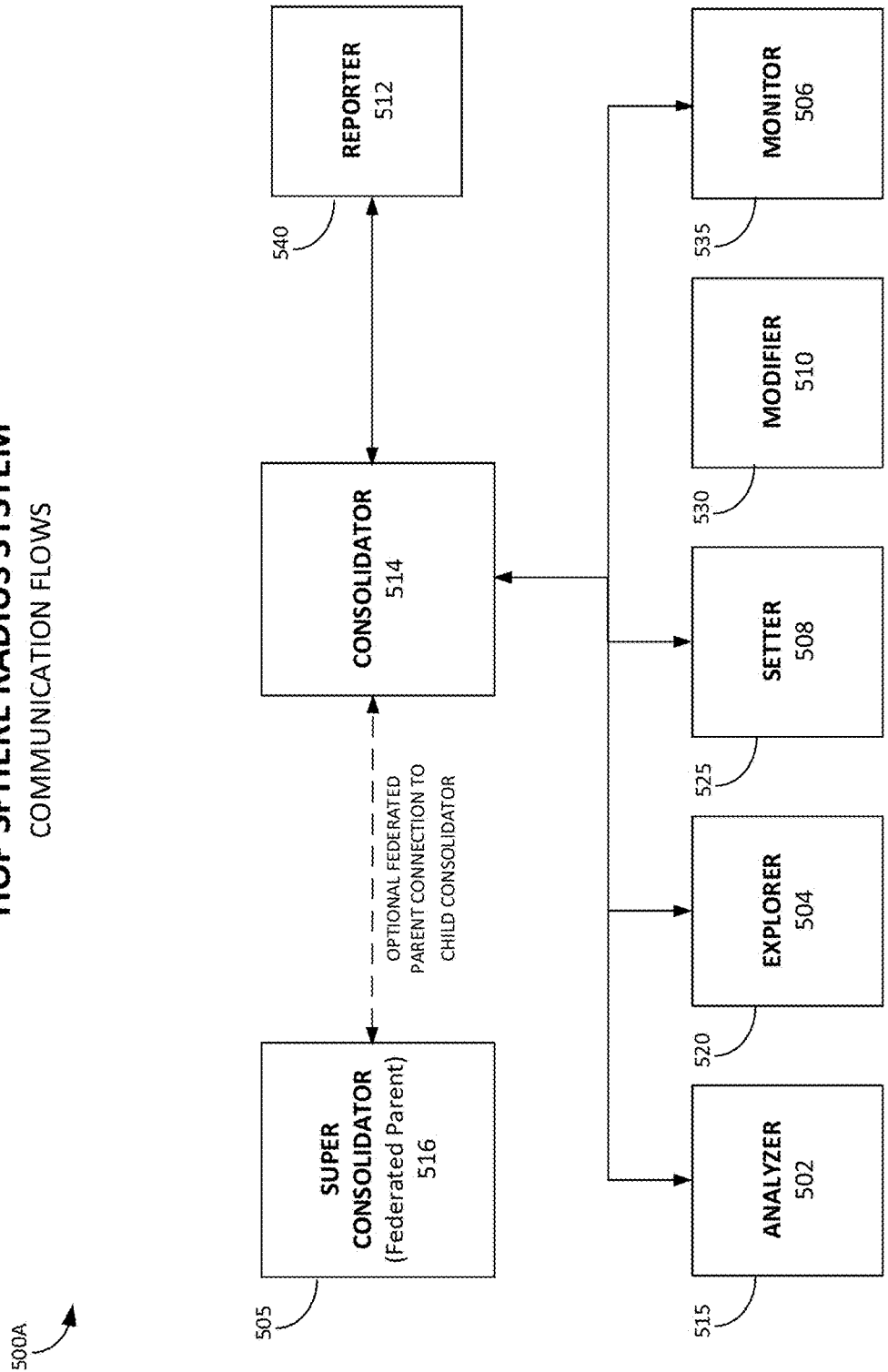
FIG. 5A is a diagram of various modules within a Hop Sphere Management System, and their communications flows according to some embodiments.
Figure 5B:
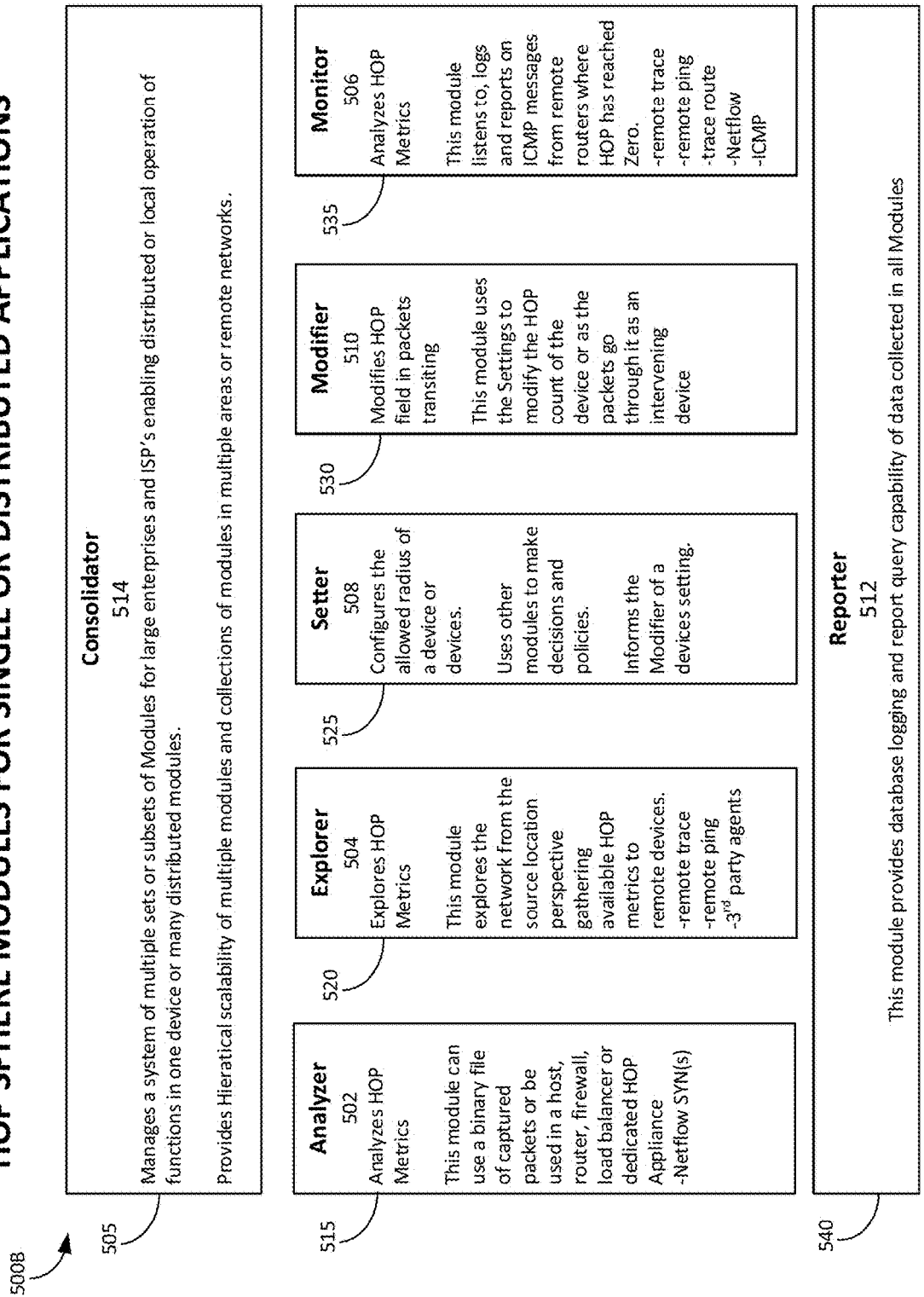
FIG. 5B is a diagram of the Hop Sphere Management System with descriptions of the primary function of each module according to some embodiments.

With reference to FIGS. 5A and 5B, Hop Sphere Radius Management System provides dedicated purpose modules for discrete functions and/or automating aspects of the system. In some embodiments, the modules are implemented within discrete hardware components. In some embodiments, the modules are implemented as a special-purpose module within a common hardware component or inside the device itself as fully combined functions. In some embodiments, some of the modules are implemented within a common software feature set. Accordingly, descriptions of discrete modules may be interpreted to include any suitable software, hardware or combination thereof. The Hop Sphere Radius Management System 500 includes Analyzer 502 and Explorer 504, which cooperate to investigate and estimate the number of router hops required for data transmission between a pair of originating and remote data devices. FIGS. 5A and 5B embodiments briefly describe and illustrate the component functions and communications of a closed loop feedback Hop Sphere Radius management system are briefly described and illustrated. Analyzer 502 learns the existing device HOPvOSD setting being used to communicate with approved devices, at stage 515, of the Analyzer 502. Analyzer 502 is helped by the Explorer 504 to gather more granular hop topology at stage 520, through investigative triangulation test methods using a variety of internal and external resources. Armed with the knowledge of existing device hop statistics, Setter 508 configures the values at stage 525 through secure logged access methods to set a reduced, safer, HOPvLMT value in the discrete device using Active Directory or Dynamic Host Control Protocol (DHCP) option 23 TTL or HOP settings. If Setter 508 cannot configure the device, or the device is hard coded and cannot be set, Setter 508 can choose to use a Modifier 510 in the device path at stage 530 before it passes to the Internet or other suspect region requiring a reduced HOPvLMT setting. After the HOPvLMT has been set, the Monitor 506 listens for ICMP HOPvZR0 discard notifications at stage 535 to detect when the device attempts to communicate outside the protected sphere and exceeds the allowed HOPvLMT value. The Consolidator 514 ties all the system components together at stage 505, and provides policy setting ability while allowing administrators to set values when default or automatic values are not desired. A Super Consolidator 516 may be deployed for a federated management system over multiple discrete Consolidators 514. The Reporter 512 allows manual and automatic interval reports at stage 540 and network management messages to report HOPvZR0 escape attempts.

Figure 6:
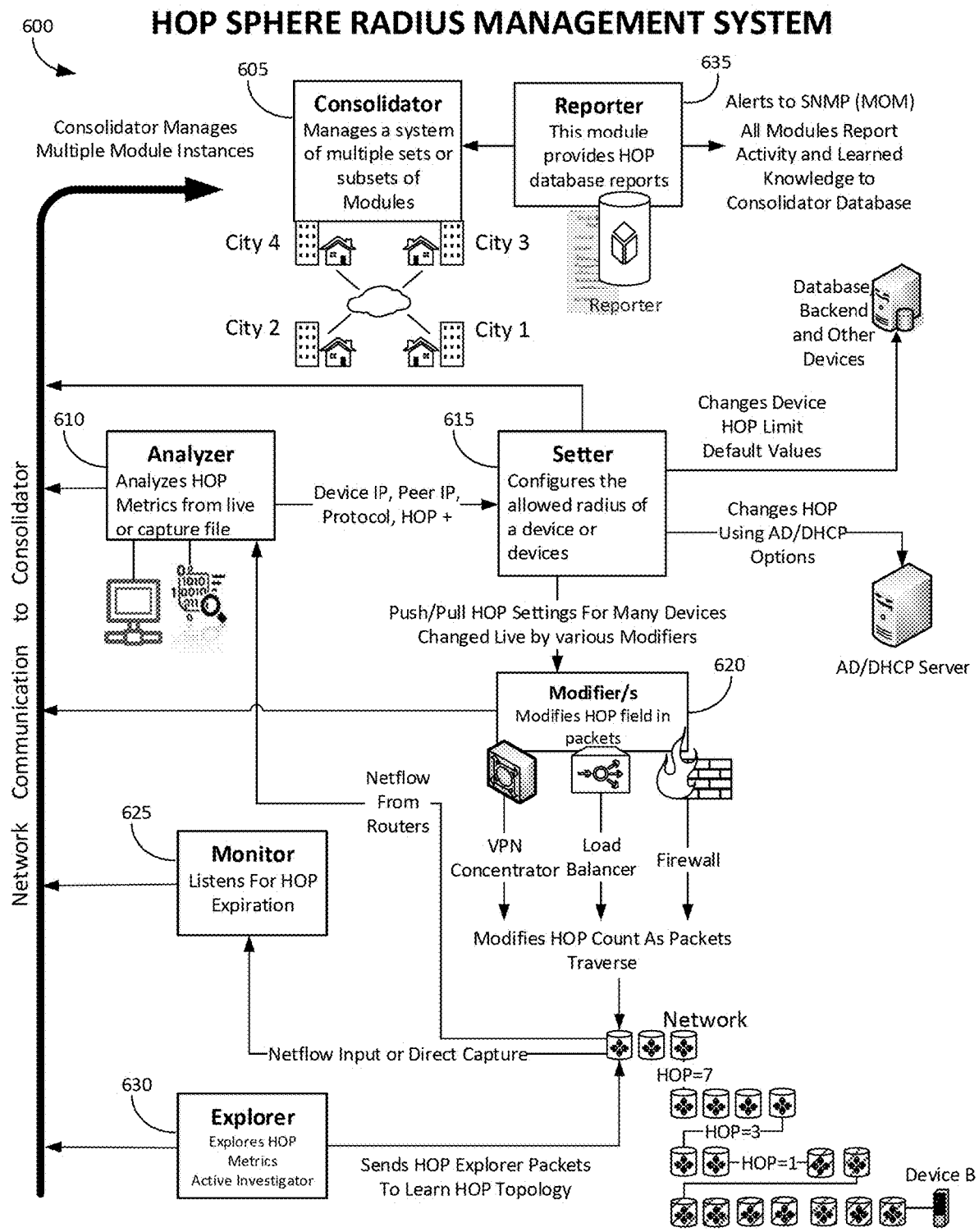
FIG. 6 is an operational diagram of a Hop Sphere Radius Management System, according to some embodiments.

With reference to FIG. 6, elements of a Hop Sphere Radius Management System 600 are shown according to one embodiment. Consolidator 514 manages a single system or multiple systems at stage 605. Each system has a Consolidator 514 and distributed the Consolidators 514 can be managed using a Super or Federated Consolidator 516. Optionally the whole system may be one Virtual machine, a single device or server, with the Consolidators 514, 516 interconnecting all components together for communications between modules. Analyzer 502 gathers, calculates and stores HOP statistics from a variety of sources at stage 610 to include direct capture for a network, remotely captured data or a NetFlow stream from routers or other NetFlow devices. Setter 508 communicates with discrete devices or through Active Directory, DHCP Servers at stage 615 or through the use of Modifiers 510 that are capable of setting reduced HOP counts at stage 620 as packets traverse its network interfaces. Monitor 506 listens to the network at stage 625 or to NetFlow for devices attempting to communicate beyond their approved HOP limits. To corroborate HOP values or investigate topology problems Explorer 504 actively probes the network at stage 630 or gets assistance from remote or third-party path trace tools to troubleshoot, resolve and database more granular topology through triangulation. Reporter 512 acts to notify network management at stage 635 of issues and provides log and statistics reports.

Figure 7:
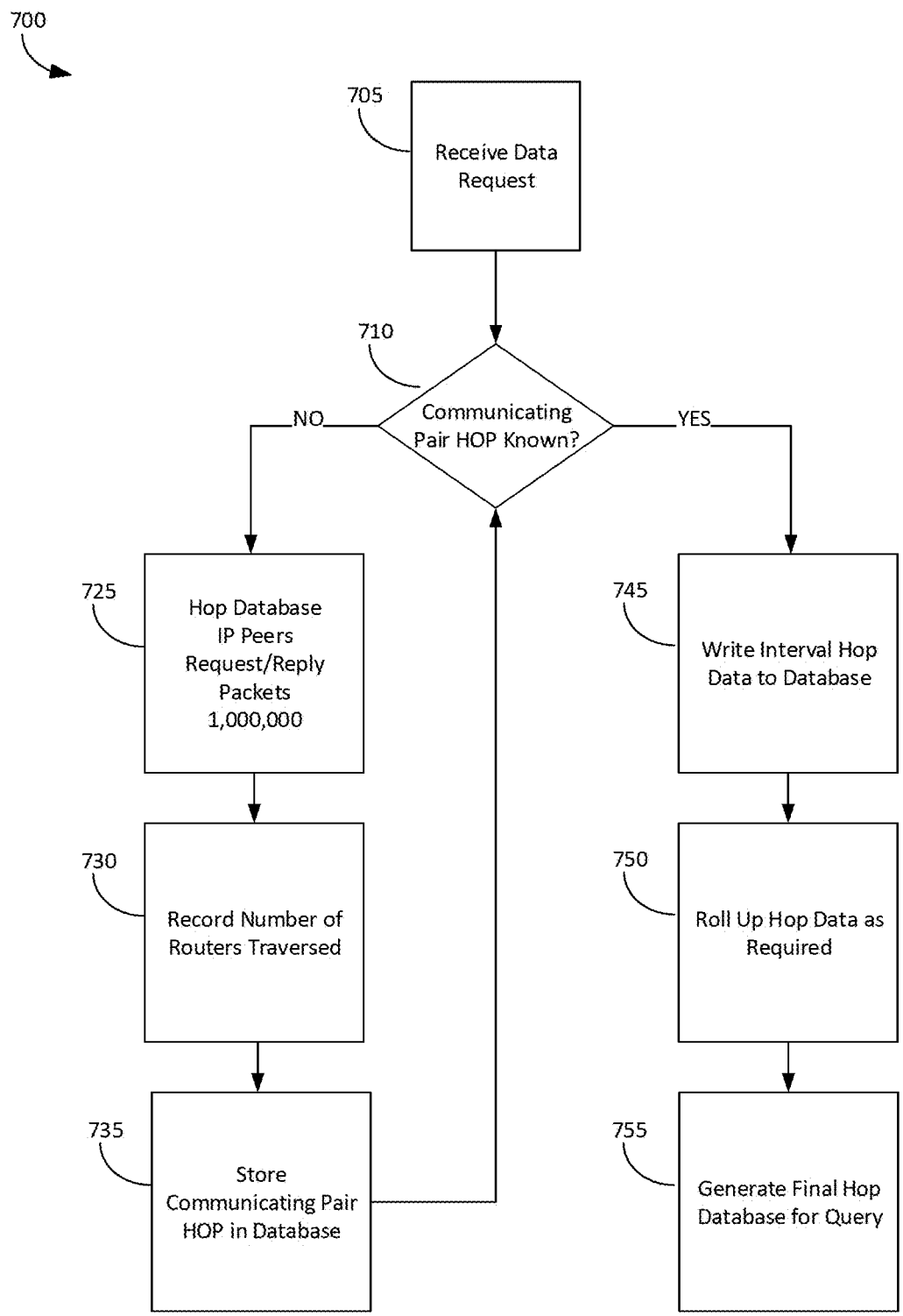
FIG. 7 is a flow chart of a method for tailoring a hop sphere for a communicating pair of devices, according to some embodiments.

With reference to FIG. 7, a flow diagram is shown for one embodiment of HOP Sphere Radius Management Method 700, including process logic for collecting communication packet information used by the Consolidator 514 to determine HOP values according to some embodiments. A database is created using an algorithm to determine peer conversations, hop data and other information to provide metrics for every device connection by unique peer. The flow diagram is one embodiment of Hop Sphere Radius Management Method 700. The first device receives a data request from a second remote device. (Stage 705). The Analyzer module 502 checks the database 104 for hop metrics for the respective communicating pair 160. (Stage 710). If the respective hop metrics are not known for the communicating pair, Explorer 504 uses exploratory data packets to investigate the communications pathway between the communicating pair devices. (Stage 725). Explorer 504 determines the number of routers traversed by the exploratory packets communicated between the communicating pair devices (Stage 730) and records these hop metrics in database 104. (Stage 735).

Figure 8:
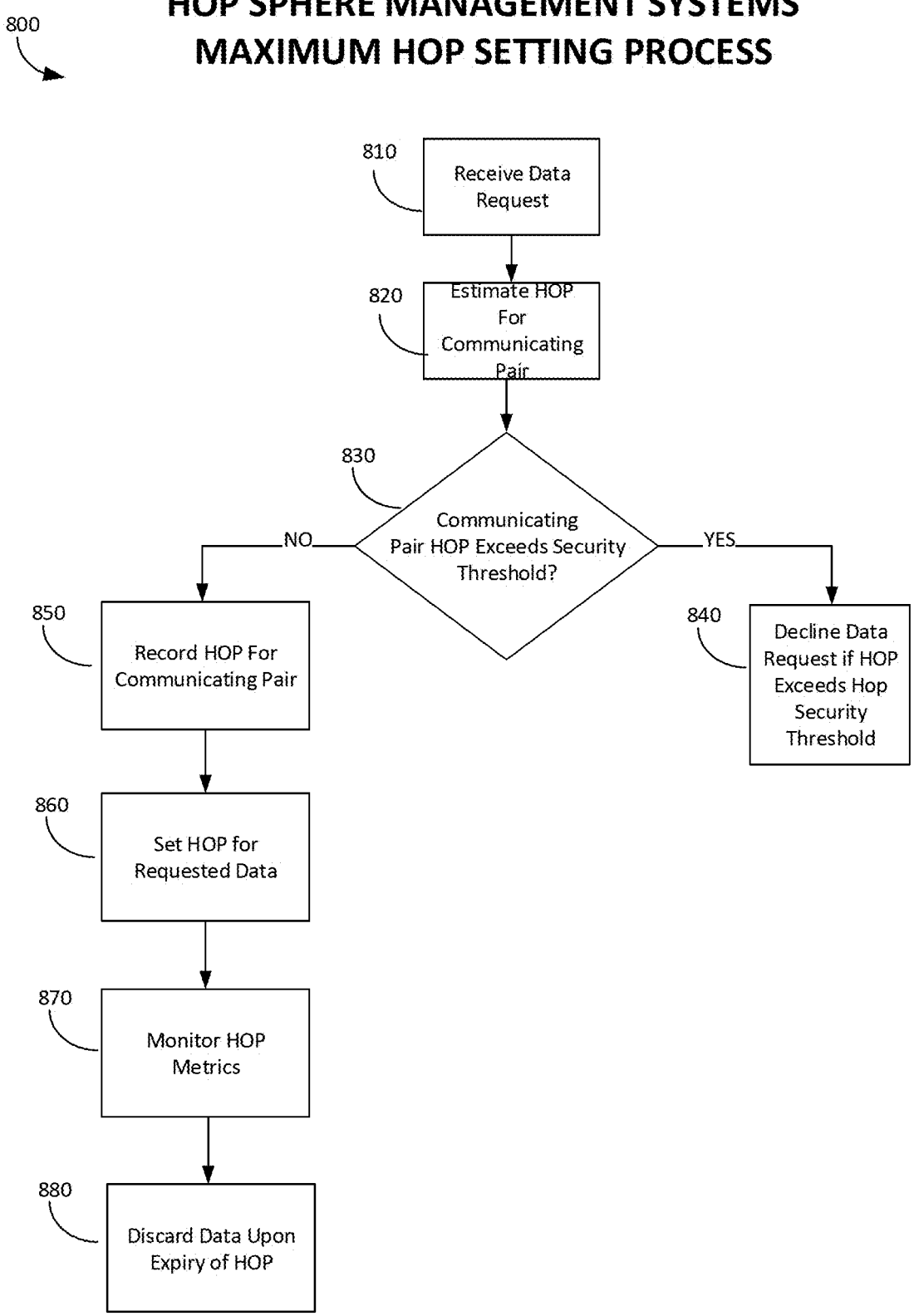
FIG. 8 is a flow chart illustrating a method for preventing communications between a communicating pair of devices beyond an approved hop sphere, according to some embodiments.

With reference to FIG. 8, a Hop Sphere Security Management Method 800 is illustrated including all Hop Sphere System modules in respective roles for determining HOP values, setting, monitoring and investigating compliance. FIG. 8 includes processes for preventing device access from remote locations beyond an authorized hop radius. A first device receives a request to consummate a communicating transaction. (Stage 810). Analyzer 502 and/or Explorer 504 determine the relevant hop metrics for the communicating pair, either through lookup in database 104 or through transmission of exploratory packets. (Stage 820). Analyzer 502 determines whether the required hop count to consummate the communications is below an authorized threshold indicative of a secure hop radius. (Stage 830). If the estimated HOP value exceeds a predetermined secure threshold metric, the system 100 may decline to consummate the communications session, e.g., by setting outgoing HOP values below the number of hops required and send an alert to Consolidator 514. (Stage 840). If the estimated HOP value does not exceed the secure threshold, the estimated HOP value and related metrics for the communicating pair are stored in database 104 for future reference. (Stage 850). Setter 508 and Modifier 510 then establish and set the HOP count value for the outgoing data packets. (Stage 860). Monitor 506 continuously monitors the HOP count for the data packets to determine whether they have expired, have been delivered, or have been discarded. (Stage 870). According to the HOP count values established and applied to the data packets, the respective final node discards the data packets upon expiry of the HOP count value. (Stage 880).

Figure 9:
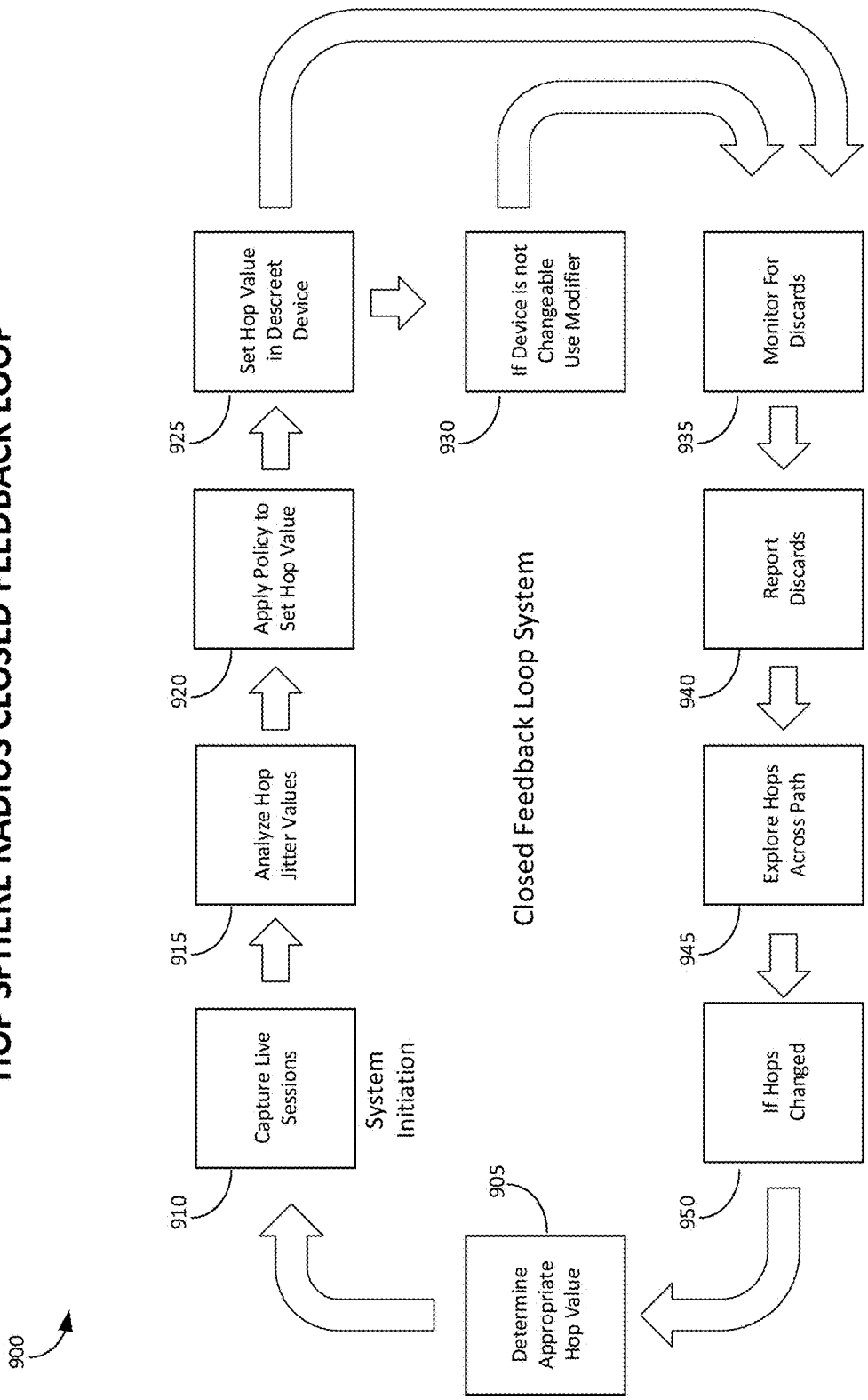
FIG. 9 titled "Hop Sphere Radius Feedback Loop System" is a flow chart illustrating a method and component interoperation for a closed feedback loop for setting a more secure HOPvLMT value reducing Hop values while allowing existing communications.

With reference to FIG. 9, Hop Sphere Radius Feedback Loop operation is described according to one embodiment of the Hop Sphere Radius management system. Various embodiments may employ different components or alternative manual administrator processes. Default HOPvOSD values are by default, set dangerously high and should be set at stage 905, to a more appropriate lower HOPvLMT value. Actions in the feedback loop step through the basic process to determine and reduce and set HOP values to a more secure value. Analyzer 502 gathers existing hop consumption between devices. (Stage 910. Hop). TTL/HOP variations collected determine high and low HOPcBTN value variations 915 referred to as Hop Jitter. (Stage 915) Calculations derive the number of hops HopvBTN consumed by subtracting the original HOPvOSD value from the returned values HOPvDST after transiting the network. A default HOPvOSD=64 of 64 minus the after-transit value of HOPvDST=54 equals, HOPvBTN=10, which is the number of router hops between consumed in transit. Confirmation of the Default HOPvOSD can be corroborated using new Explorer 504 triangulation investigations or historical investigation statistics in the database. Policies are factored in to determine and set a new HOPvLMT value for each device. (Stage 920). The system sets the HOP value in the discrete device whenever possible, creating an independent end point without dependence on other security systems. (Stage 925). If the device HOPvLMT cannot be modified at the device, a Modifier 510 is used to change HOPvLMT value in the device IP stream in real-time. (Stage 925) MONITOR 506 awaits ICMP discards at stage 935 HOPvZR0 and reports the discards at stage 940 to Consolidator 514, which spawns an investigative process at stage 945. Explorer 504 actively investigates the path topology and geographic topology as needed. If hop consumption has changed, the system re-determines the appropriate value in real time within in a closed loop starting at determining the appropriate HOPvLMT value. (Stage 905).

Figure 10:
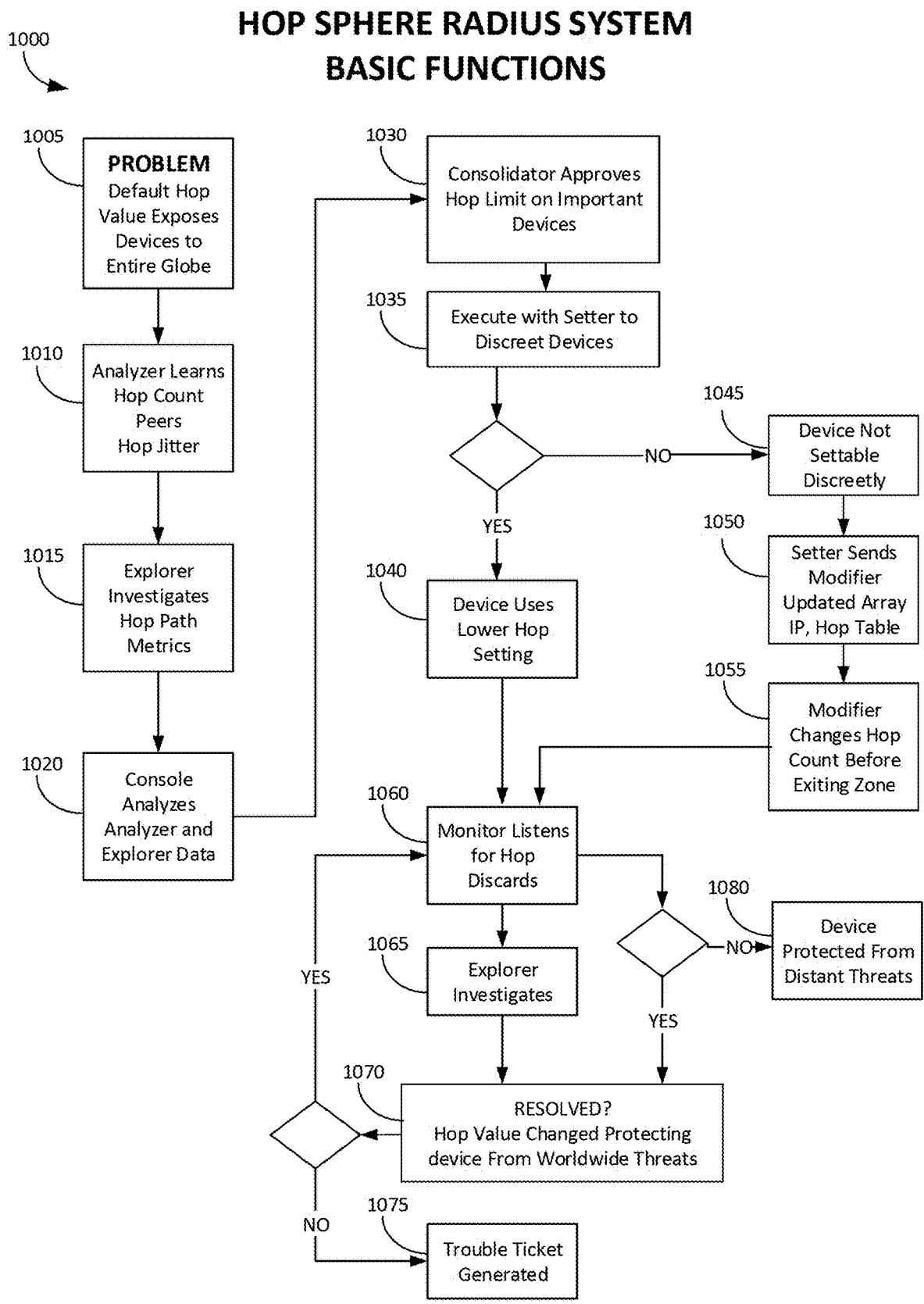
FIG. 10 titled "Hop Sphere Radius System Basic Functions" illustrates module function and interoperability.

With reference to FIG. 10, Basic Functions of the HOP Sphere Radius System 1000 are illustrated. The system manages the problem created by high default HOPvOSD values that expose devices to unnecessary potential risk from hacking and malicious devices than necessary. (Stage 1005). Analyzer 502 learns HOPvBTN counts used between communicating peers by capturing their respective high and low HOP counts that determine Hop jitter variations. Explorer 504 investigates hop paths and the geographical topology between communicating peers. (Stage 1015) CONSOLIDATOR 514 uses the data from Analyzer 502 and Explorer 504 to arrive at a more appropriate HOPvLMT, tailored HOP value. (Stage 1020. Consolidator 514 affirms automatic settings for key devices (stage 1030) or administrator adjusts settings. Setter 508 changes the HOP value on the discrete device (stage 1035) and the device now uses the new HOPvLMT value (stage 1040). If a device is not discretely changeable at stage 1045 Modifier 510 accepts information from Setter 508 to set the packet values in real-time by an internetwork component or device agent running a Modifier agent in software. Setter 508 provides IP addresses for which to make changes as packets traverse in real time across Modifier 510. (Stage 1055). Modifier 510 changes the HOPvLMT 1055 value before the packet exits the zone. (Stage 1055) After the new HOPvLMT value is implemented, Monitor 506 listens for ICMP HOPvZR0 discard messages (stage 1060). If discards are found, Explorer 504 investigates the topology path. (Stage 1065). If discards are explained and cleared, then Monitor 506 operations continue (stage 1070) or new HOPvLMT value is determined. If HOPvZR0 discards continue (stage 1075), a Trouble Ticket is generated for corrective action or awaits the Internet to be repaired. If no discards are discovered the device is protected from broad threats. (Stage 1080)

Figure 11:
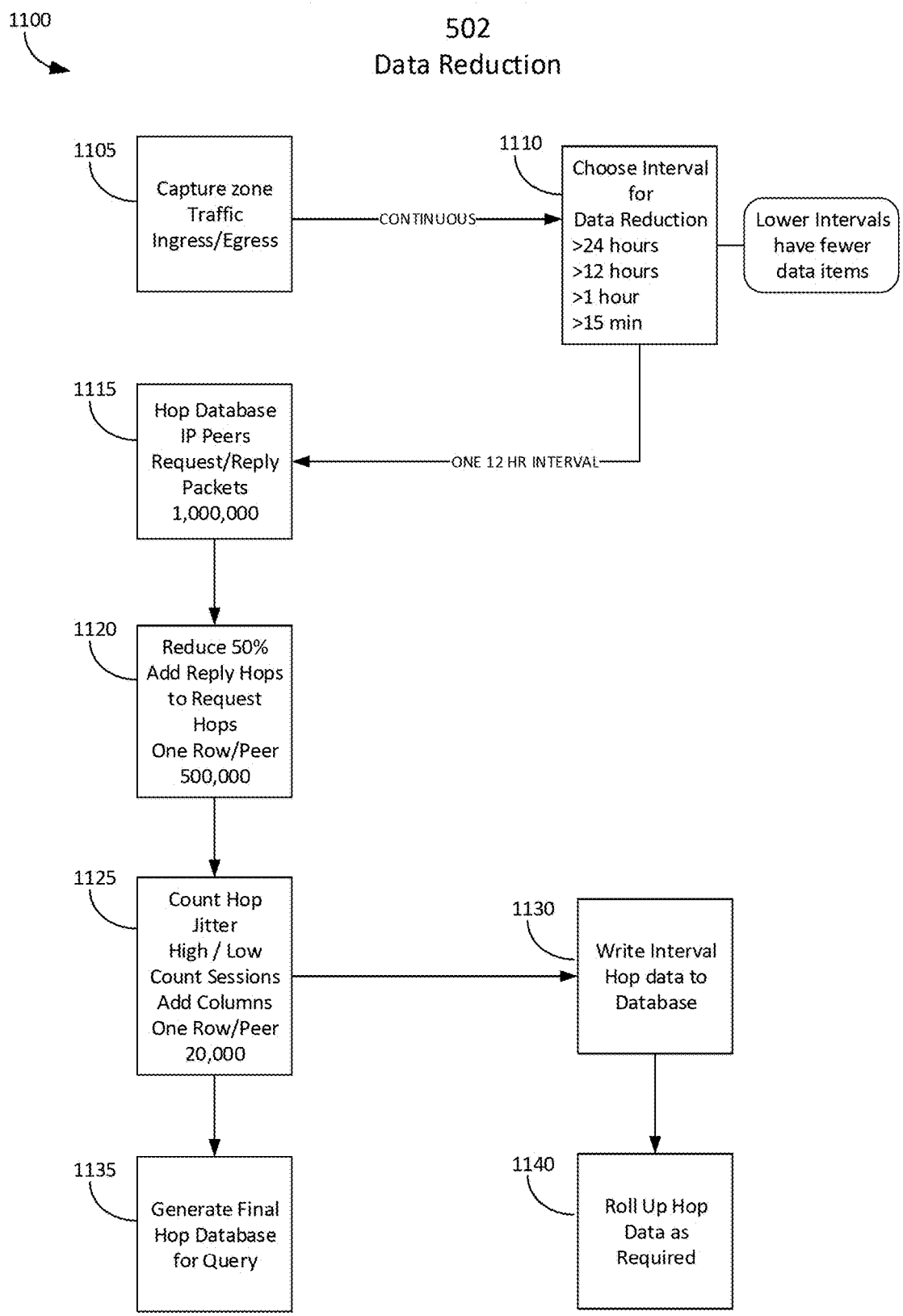
FIG. 11 is a flow chart illustrating operation of Analyzer 502 in collection and reduction of data in the Data Reduction Process.

With reference to FIG. 11, "Analyzer Process," the process for data capture and reduction by Analyzer 502 is shown. Analyzer 502 receives data from Network Capture Zone (stage 1105) from tap points where packets can be observed passively, from retrospective packet caches, or NetFlow data from various routers or NetFlow enabled devices. Intervals for summarization (stage 1110) may be chosen to reduce data and provide retrospective history of HOPvTRN values and hop consumption HOPvBTN between devices. All Request and Reply packet HOP values are saved to database. Data is reduced (stage 1120) by creating a reply field and combining peer sessions into a single entry. This reduces the data by 50% for all unique sessions. Many peers have repeated connections (stage 1125). Data is then further reduced by adding a field for session counts and then eliminating repeated session rows while harvesting HOPcBTN high and low values to enable calculation of Hop Jitter. Interval data is collected and saved to the database. (Stage 1130). Intervals are rolled up by interval history hours, days, weeks, months, quarters, years, as required. (Stage 1140). The desired interval data is used to calculate new HOPvLMT values. (Stage 1135).

Figure 12:
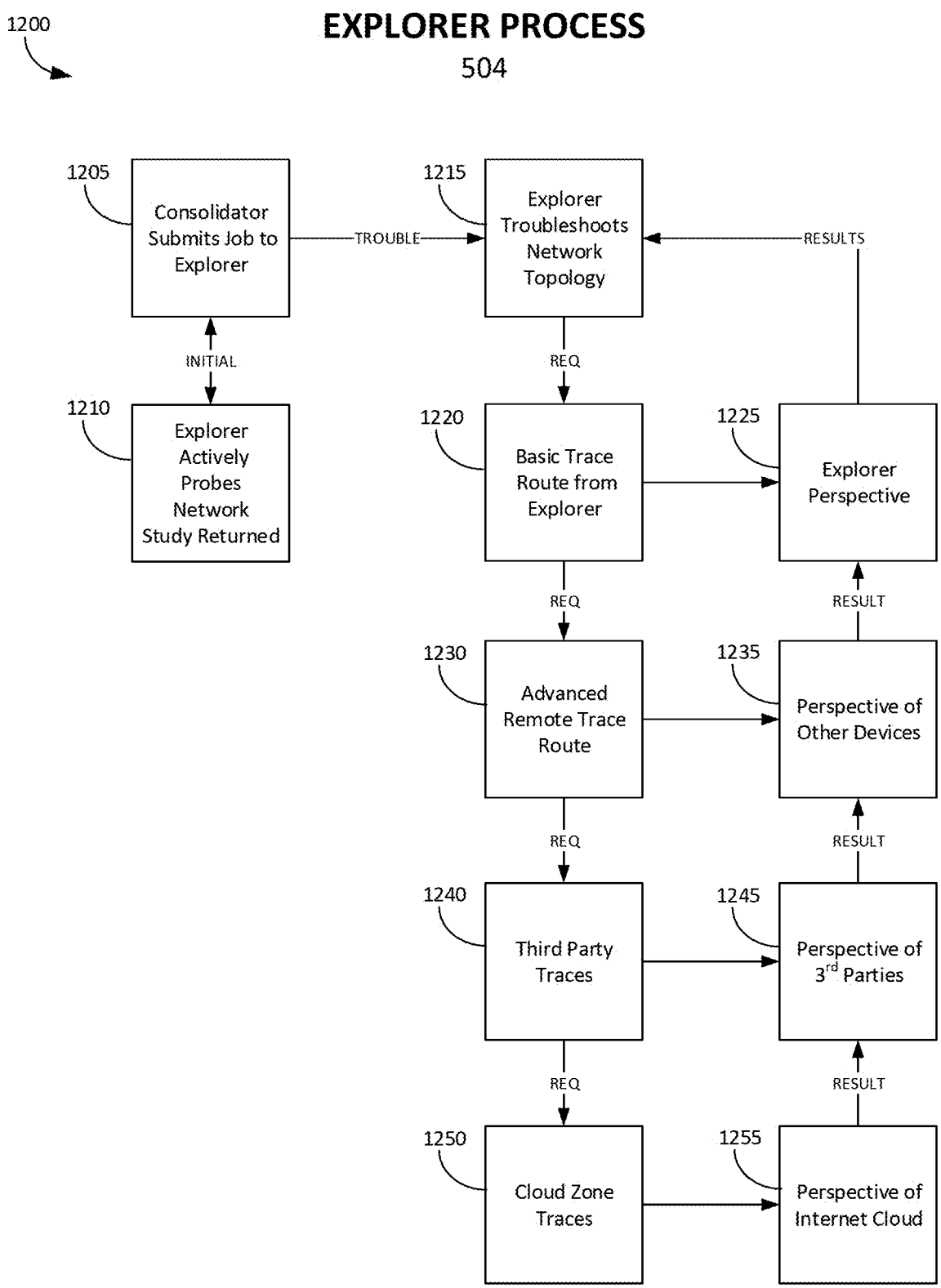
FIG. 12 is a flow chart illustrating operation of Explorer Module 504 according to one embodiment.

With reference to FIG. 12, "Explorer Process," process logic is shown for the function of the Explorer module. Consolidator 514 initiates an investigation request and sends it to Explorer 504 concerning a device connection alert. (Stage 1205). Explorer 504 may be tasked with gathering detailed path topology and geography information from multiple sources as requested by other modules. (Stage1215). Geographic topology is determined by using publicly available subscriptions to GeoIP databases or online real-time lookup of an IP address to its geographical location. Each IP address found in the network path topology is looked up to determine its location and is recorded in the database.

Basic Trace Route records router path IPs at stage 1220 from the perspective of the Explorer (stage 1225).

Advanced Remote Trace Route records router path IPs at stage 1230 from the perspective of other remote devices such as routers or other available trace route agents. Third Party Traces record router path IPs at stage 1240 from the perspective of third-party service providers or agents. Cloud Zone Traces records router path IPs at stage 1250 from the perspective of Internet Cloud Zones. Replies from a variety of system perspectives 1225, 1235, 1245, 1255 provides additional three-dimensional views of the device location and geographical perspective. Explorer performs path discovery using ICMP, TCP, UDP or other protocols and ports using Hop starvation along a path.

With reference to FIGS. 5-6, TTL/HOP Sphere Radius Security Management System 500, 600 provides dedicated purpose modules for discrete functions and/or automating aspects of the routers and components in a path between devices. It peers with routers such as BGP, OSFP, IGRP, IS-IS or route analytic systems and API services to gather network topology, changes or reliability information.

With reference to FIGS. 13-18, functions of various system modules are listed, including functions of the Consolidator; Analyzer; Explorer; Setter; Modifier; Monitor and Reporter Modules.

Hop Sphere Radius Analyzer 502

Figure 14:
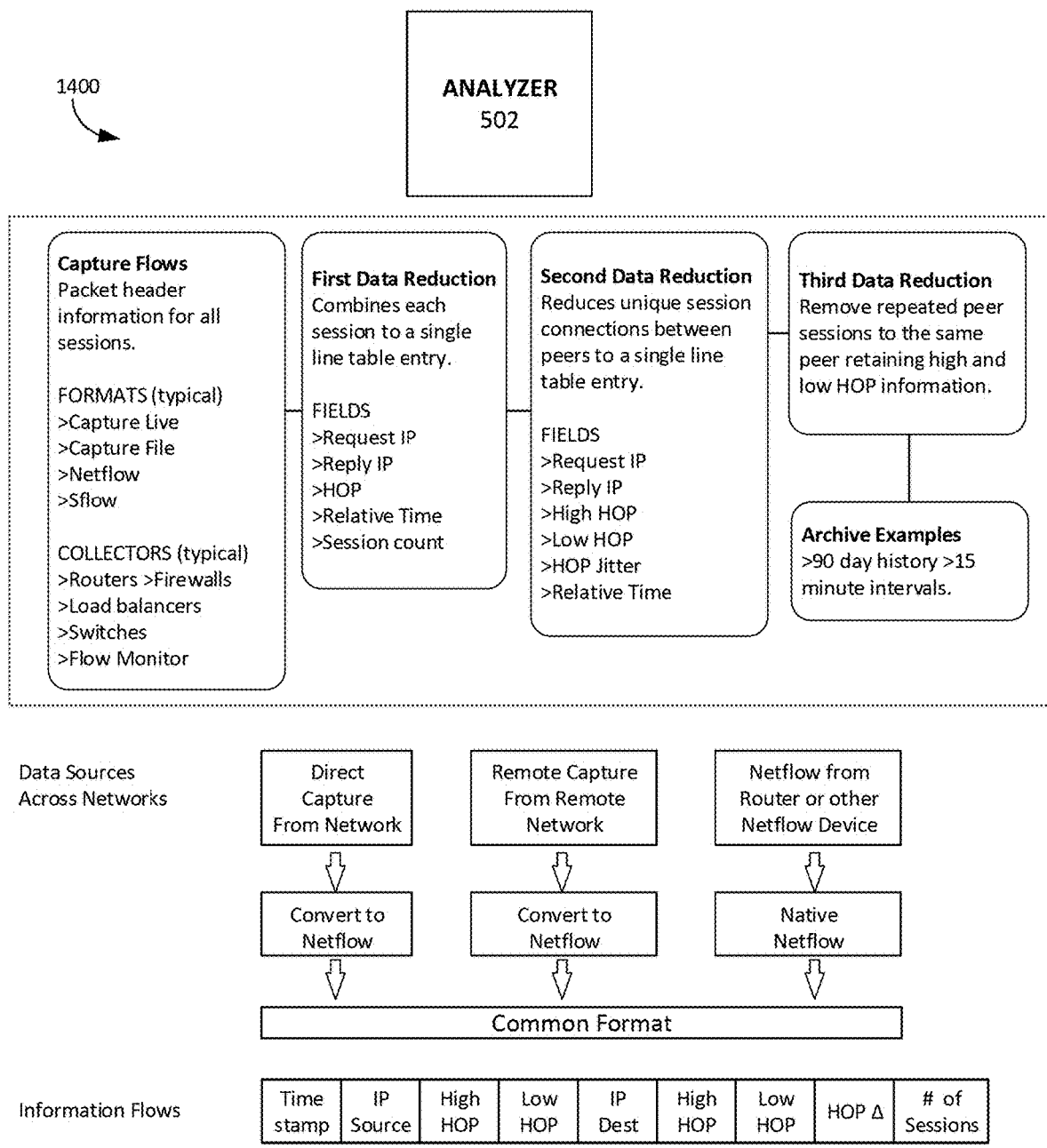
FIG. 14 illustrates elements and aspects of the Analyzer Module502.

With reference to FIGS. 5 and 14, Analyzer Module 502 is the initial collector of HOPvHop count statistics as seen on the network. Discovering the actual HOPvOSD values is the first step in determining the appropriate lower HOPvLMT secure Hop setting to limit data transmission distance. The collection of HOPvHop counts can be gathered through direct packet capture or remote packet capture, or a previously captured trace file from any location. Whether captured locally, remotely or provided by a router through NetFlow, the HOPv values are collected and the data reduced by the Analyzer 502 in at least one of the following manners.

NetFlow is a type of remote capture provided gathered inside routers by an ASIC chip, provides high-speed network flow statistics. As packets traverse from device to device across network routers, session flow transiting the router seen by the ASIC chip sends the metric data for observed flows to a specified central Console to be stored in a database of flows. NetFlow inside a router, a switch, a firewall or other internetwork component can be used as the source of data so direct capture by Analyzer 502 does not have to occur locally. NetFlow devices capture redundant links to the Internet or inside private networks simplifying HOPv data collection.

Many routers can send HOPv flow statistics information to Analyzer 502 providing connection HOPv values to and from peer devices. NetFlow timestamps may also be provided. Analyzer 502 through NetFlow obtains raw metric session data with the IP address of the source device inside a firewall and the distant destination of the IP address of the designation device inside or outside the organization.

Packet transaction information from a variety of source methods, local capture, remote capture, files from disconnected network captures, NetFlow feeds from routers providing HOPv, and the like, all provide for Hop value discovery between devices eventually used to set HOPvLMT values in an automated manner for thousands of devices in large and small organizations.

For example, if a packet route takes 21 HOPcBTN hops at the high and 18 HOPvBTN at the low across 10,000 sessions, with a hop jitter of three HOPs, the difference between high and low hop values. Hops are logged for the given communicating pair/route. The confidence score or confidence factor is also improved by having logged 10,000 sessions between 18-21 HOPs, providing a good confidence of the actual values in the network from which to offer a HOPvLMT basis for setting value above 21 for this device.

Adding a small amount of overhead to the observed high hop count covers variations in route topology. The Analyzer data is used by Consolidator 514, 516 to apply policies toward new secure Hop values for a given device. Consolidator 514, 516 issues a command through Setter 508 to apply a more secure Hop value based upon policy or static amount to the device.

Another element of Analyzer module 502 includes an algorithm to measure the response time and assess the reasonableness of the HOP value. For example, using collected timestamp delta time between request and reply, a connect time of 400 milliseconds would not reasonable for devices six hops away across very high-speed technology. Such long times could indicate attempts to mask the true Hop distance via VPN access. Analyzer 502 may use theory calculations to determine latency delays and calculate theoretical latency to provide a greater confidence for the accuracy of the HOP values discovered Hop values.

After serializing a packet on the wire at a certain transmission speed, packets sit in a queue awaiting a routing or switching decision. Once serialized and set up for a decision for the packet to go to the next HOP, calculation of the time from theory provides a method of checks to gain more confidence in the location of the device. For example, if transmitting across a 10-megabit circuit, 1,500 Bytes or 12,000 bits, it would take about 1.2 milliseconds for each packet and each Ethernet traversed. For 10 segments of 10 Mb Ethernets, it would take 12 ms just for serialization delays on each network.

If packets must wait in the buffer to be decided upon by the switch for one millisecond each time, each packet would be delayed another one millisecond, for a total of 22 milliseconds. Additionally, if the packet had to go 20,000 miles, it would experience propagation delays impacting the speed of transmission, interconnecting transmission delays, bit repeaters and other such switching components usually equating to about one millisecond per hundred miles. The speed of light is measured in a vacuum without any problems or slowdown. Wire resistance delay is usually 0.6 to 0.7 times the speed of light, plus switching decision time, queuing and response processing delays by the peer device. Thus, these known delays can be used to validate a Hop count against the likely geographic distance of a packet transmission.

If there is an anomaly or a question about the integrity of the time required for a connection, Setter 508 can request Explorer 504 to investigate the path, e.g., in response to anomaly alerts from Monitor 506. Explorer 504 provides services for Setter 508 to investigate the Internet and provide a more accurate location of the device or devices nearby and the associative response time nearby it so that it can corroborate and confirm results. This allows Consolidator 514, 516 to alter the TTL/HOP configuration to prevent the device connection to that location based upon the HOPvLMT count.

Hop/TTL Sphere Analyzer Module ("Analyzer Module" or "Analyzer") 502 can be implemented in a device as an agent, as an external listener to device packets or collected from a remote packet capture file of packets. Examples are various local and remote packet capture capabilities from network taps, or NetFlow programmable ASICs forwarded by routers and other similar implementations in Analyzers and internetwork components containing HOP statistics and session information. Packet transactions from bidirectional communications sessions between two devices are gleaned for their HOPvTRN values in both directions allowing Analyzer Module 502 to perform dynamic automated HOP discovery about a device, devices or location by examining the HOP field of the relevant IP Header. Analyzer Module 502 automatically discovers gleaning HOP metrics from device packets and parses the HOP metric statistic data for use by administrators or by an automated Setter Module 508 in setting the HOP radius.

To tailor the HOP radius to allow appropriate HOPvLMT distance communications and protect a device from undulyremote access, an analysis is performed to determine the required communication HOPcBTN distance for the device. HOP Sphere Analyzer 502 actively, in real-time or retrospectively, examines the communications of one or many devices gathering communications packets on a live network or passively on or off network. Analyzer 502 is configured to examine the communicating TCP/IP devices to collect and store metrics for communicating pairs and their respective IP header HOP field values. Analyzer 502 listens and records variations in HOP, sometimes called "HOP Jitter" (variations in HOP for a session) to learn the TTL/HOP likely required for a communication exchange.

The values and ranges discovered from Analyzer 502 are used to set HOP limits on a device or devices, whether by administrators or by software algorithms. Analyzer 502 may be integrated into an individual device itself or may examine communications packets externally to determine the remaining HOP of the devices and communicating pairs. Analyzer 502 discovers the number of HOPcBTN to and from hops consumed both directions between communication peers and places the resultant information about communicating pairs into a database, including IP addresses, response times, number of sessions and HOP counts for the bidirectional communication between device pairs.

Analyzer 502 may capture and examine HOP data or metrics for communicating pairs and store the HOP data or metrics with other data from IP and TCP fields. Thus, the protocol may be determined, for instance the TCP header denotes the application used to communicate with a peer. Once HOP metrics for a given IP Pair are gathered and learned for a period, and stored, the resultant metrics can be used to learn the required HOP setting appropriate for communicating devices. Setting the HOP values to correspond to historic HOP metrics will allow a device to communicate with other devices while preventing the device from communicating beyond the distance required.

By recording HOP values of communicating pairs/peers of IP addresses and identifying the known common operating system HOP default starting value settings and operating system fingerprint hints in session setup options, the system can learn and estimate the likely number of HOPs required to reach the device. The actual number of HOPs required can be determined or corroborated by active exploration through the sending of Explorer test packets by the Hop Sphere Explorer 504 to validate and actively learn the HOP value settings that allow desired communications, and limit undesired communications. Thus, Analyzer 502 examines historical information to estimate the HOP value for a given device to protect it from internet nodes and places well beyond its required sphere of communications.

Millions of transactions are reduced to thousands by expressing request, reply, high and low Hop and number of sessions to a single row for each peer connection. Hop jitter is calculated from low and high hop delta. Tables are generated and passed to Consolidator 514 for Setter 508 to retrieve the new Hop configuration. Statistics are preserved for 36 hours and updated to Consolidator 514. Data is available to Reporter 512 in real time. Data Reduction Response Time vs. Hop Corroboration Analysis If hop=6 yet response time is 400 ms, then flagged for further study by console admin or advanced policy decisions. Response time and hop analysis, plus additional Explorer module tests ensure greater confidence.

Hop Sphere Explorer Module 504

Figure 15:
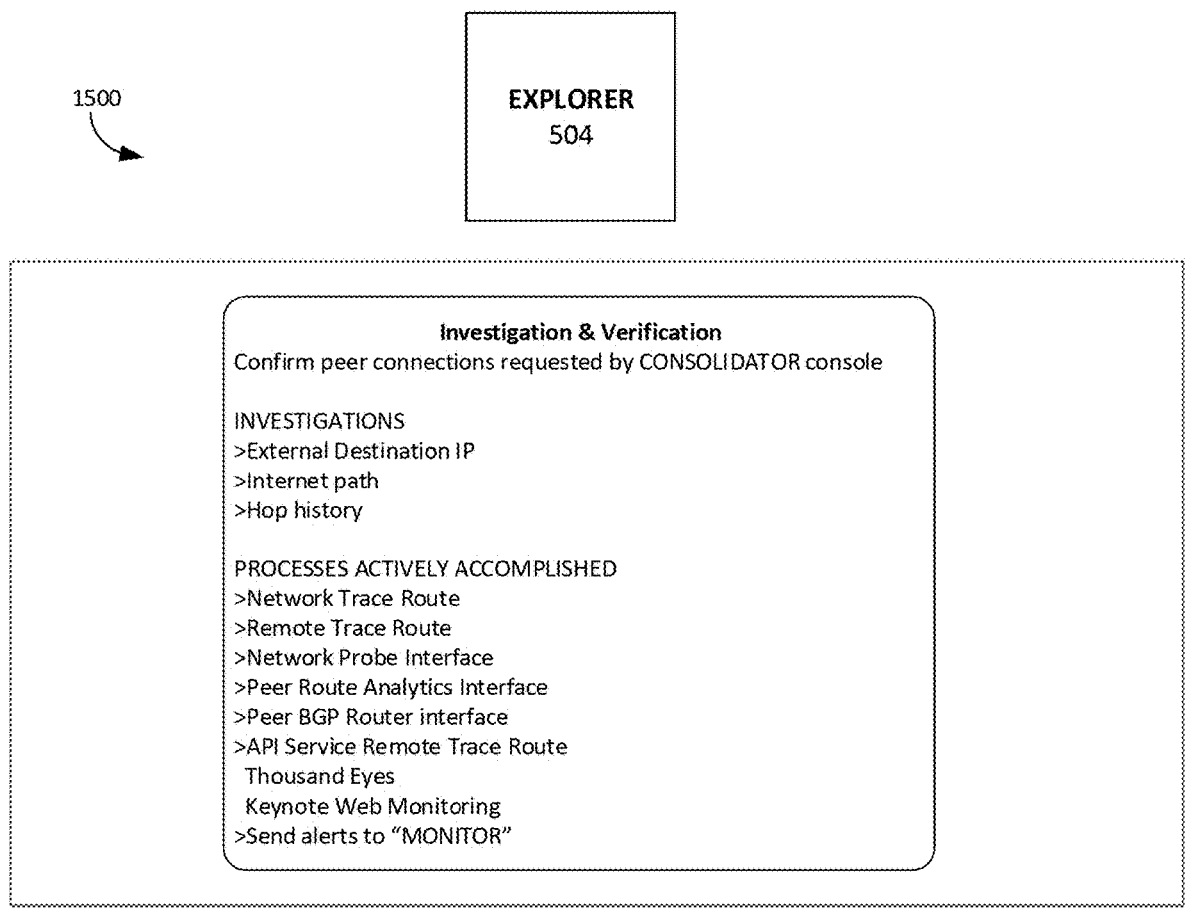
FIG. 15 illustrates elements and aspects of the Explorer Module504.
Figure 16:
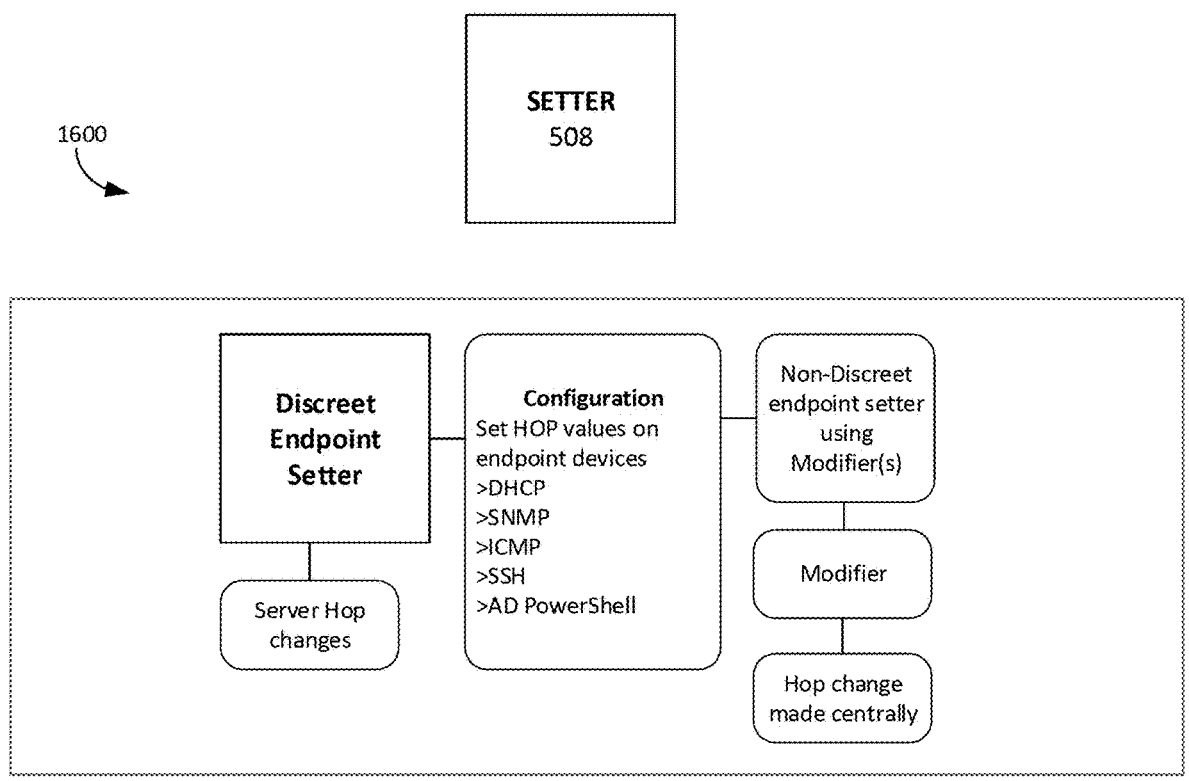
FIG. 16 illustrates elements and aspects of the Setter Module508.
Figure 17:
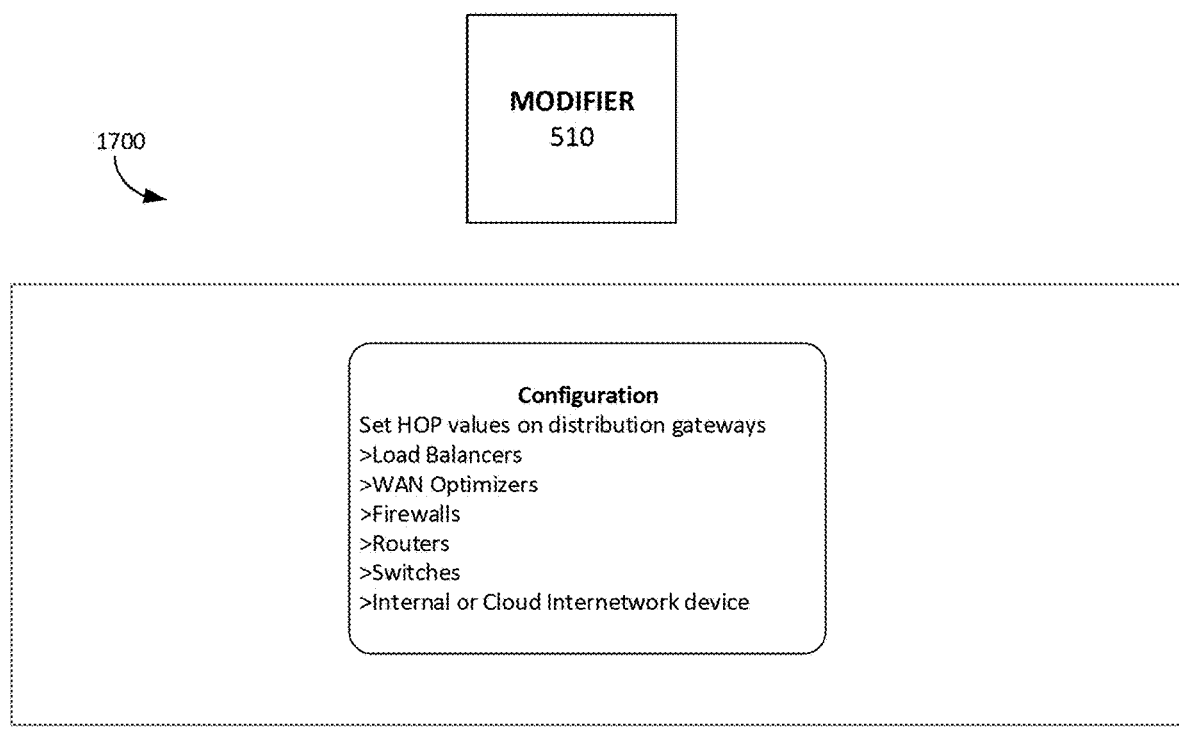
FIG. 17 illustrates elements and aspects of the Modifier Module510.

With reference to FIGS. 5 and 15, TTL/HOP Sphere Explorer Module ("Explorer Module") 504 performs automated learning of TTL/HOP metrics from a location or multiple locations by active packet exploration and parsing of responses. Explorer Module 504 can perform trace routes directly, or use pings, or any other kind of path determination. It can also peer with other remote internal or external components to perform remote trace routes from the Internet, or from an Internet agent, or from a router, or any API service to perform remote trace routes and remote connections to validate the connection time and the HOPv to any given location.

Explorer 504 performs active investigation as needed to validate observations logged by Analyzer 502. Setter 508 then sends setting instructions to Modifier 510 which sends instructions to discrete components. Explorer 504 investigates the true HOPv count required and corroborates the accuracy of this information with the transit and latency time.

Explorer 504 investigates and logs the internet path between the internal network and the external network, or between internal and internal, it investigates the path and stores that path in the Explorer, returning that information and maintaining network nodes. Explorer 504 maintains a history of information in a database so that Setter 508 may confidently establish secure Hop counts based on validated exploration of the network.

Explorer 504 can peer with a remote "route analytics" appliance, such as Packet Design or other route analytics systems. Routers on the internet can see the entire autonomous systems topology of the network through link databases and the Dijkstra algorithm. By peering with parts of that network, Explorer 504 can see all changes and all route changes to various systems, so Explorer 504 can verify and learn additional network topology from third party devices that peer with BGP, OSPF, IGRP and IS-IS router Autonomous Systems. Explorer 504 then keeps track of its investigations anytime there is some doubt in the course of learning the network from the perspective of a given organization, it is relative to its location or the location of the external device performing services for Explorer 504. The Explorer 504. Explorer 504 discovers and learns paths relative to where an organization is located to provide the topology of the private network, the internet, or a Cloud zone within the network. The Explorer database maintains this information and can be used for reference or can explore and perform new information, or it can get updates and trigger notification of problems that may keep packets from being delivered using the HOPvLMT data a specified Hop count.

HOP Sphere Explorer 504 performs automated learning of HOP metrics from a location or multiple locations by active packet exploration and parsing of responses. Explorer 504 may perform automated geographical topology discovery of the discovered HOPv sphere. Explorer 504 may explore HOP values from a source device/location perspective. The Explorer 504 uses test experience packets to gather HOP metrics for test communicating pairs or potential communicating pairs. Explorer 504 may perform tests to explore the IP address of routers reachable using varied HOP settings. Explorer 504 performs tests to learn the various communication paths adding intervening components as it learns IP addresses along the path where HOPvZR0 values decrement to zero as expiring ICMP packet notifications provide hints to learn the IP addresses of all devices in the path.

For example, a communicating pair is explored by Explorer 504 evaluating historical HOP metrics for the communicating pairs provided by Analyzer 502. Explorer 504 then explores the network by starving the HOPv field to determine the topology of the network as test packets traverse the network and expire. Exploration may be performed with a HOP count of one, two, three, etc., to determine experimentally which router(s) serves and then expires test data packets when the HOPvZR0 count goes to zero. Explorer discovery packets use all manner of protocols and ports, on UDP, TCP, and ICMP protocols. Explorer 504 may monitor notifications that ICMP provides with the number of remaining HOPv in the packet upon reply. Explorer 504 may record each intervening router where the HOP expires to learn the number of routers or HOPvDST required to reach a given IP address. Explorer 504 may also reference Geographical IP address location information about the IP address owner and user to determine a regional geographical sphere served by each HOP field setting in test packet IP headers.

Explorer 504 discovers incrementally the distance to a particular node as routers reply with ICMP notifications about the HOP expiring. That information, as well as the IP address of the node is recorded. Knowledge of an IP address is useful in looking up geographical information to determine where the IP address is located. This allows for discovery and exploration of the network surrounding the relevant device and tailoring of HOP settings to allow communication between authorized communicating pairs and to protect it from further reaches of the internet. Explorer 504 may peer with BGP, OSPF or proprietary routers or route analytics systems or online systems to learn public or private network HOPv topology.

For a device that needs only to connect to the New York area, Explorer 504 may explore the corresponding routed area networks to determine the sphere or radius of communications expressed and corresponding HOP metrics. Alternatively, Explorer 504 may be configured to behave like a router to learn network topologies from other routers. The administrator can then set the HOP to the minimum value to reasonably allow communication through the intervening routers in the New York City area. Once Explorer 504 discovers the locations allowed by a prospective HOPv value, a geographical map is provided of the sphere the HOPvHop count enables.

Additionally, any number of route analytics products or features may be interfaced by or incorporated within Explorer 504 to enhance fidelity of route information, for example when a router administrator has turned ICMP functions off. For example, Explorer 504 may learn the IP addresses of all the appropriate routers and systems within a particular radius of communications using the geographical location and the name of the particular IP address location.

Explorer 504 provides a practical learning of source nodes and communicating peers, for example, to determine the number of HOPvLMT required to communicate to the New York City area. The HOP estimate includes a small allowance for HOP Jitter (variation in HOP) as network routes change. Thus, Explorer 504 may use data about historical peers and other peers to determine a radius required to allow and limit communication within the New York City area. Explorer 504 may use the HOP value information and Geographical IP to validate the hop sphere of communications for that device. For a device in New York City, Explorer 504 may determine how many HOPvLMT are necessary to communicate in the New York City area while limiting communications beyond. This can greatly reduce the number of attackers, or would-be attackers, in remote parts of the world, able to communicate with the device.

Explorer 504 may collect HOPv metrics useful for sending network connected packets, response calculating, geographical investigating, or other investigating of Hop Sphere information. Explorer 504 is preferably implemented near the relevant devices to better explore the relative networks and to better estimate appropriate HOP settings. Explorer 504 features and services are implemented in a scripted, programmatic, or automated manner to dynamically accommodate HOP Jitter. Explorer 504 and other modules and features can be automated in a range of software and appliances.

Thus, Explorer Module 504 is an active investigation module for exploring the network to perform various functions. Explorer 504 may perform path discovery using ICMP, TCP, UDP or other protocols and ports using Hop starvation along a path to learn the routers and components in a path between devices. Explorer 504 may perform exploration functions from remote devices such as routers, firewalls, cloud devices and free or paid cloud service agents to learn network topology from other perspectives. Explorer 504 may explore peering with routers such as BGP, OSFP, IGRP, IS-IS or route analytic systems and API services to gather network topology, changes or reliability information. Explorer 504 may store route topologies in database for reference and change statistics. Explorer 504 may diagnose Hop expired ICMP notifications and may trace route path discovery through incremental (ICMP) Hop starvation. Explorer 504 may log activity and report anomalies to Consolidator Module 504.

Hop Sphere Monitor Module 506

Figure 18:
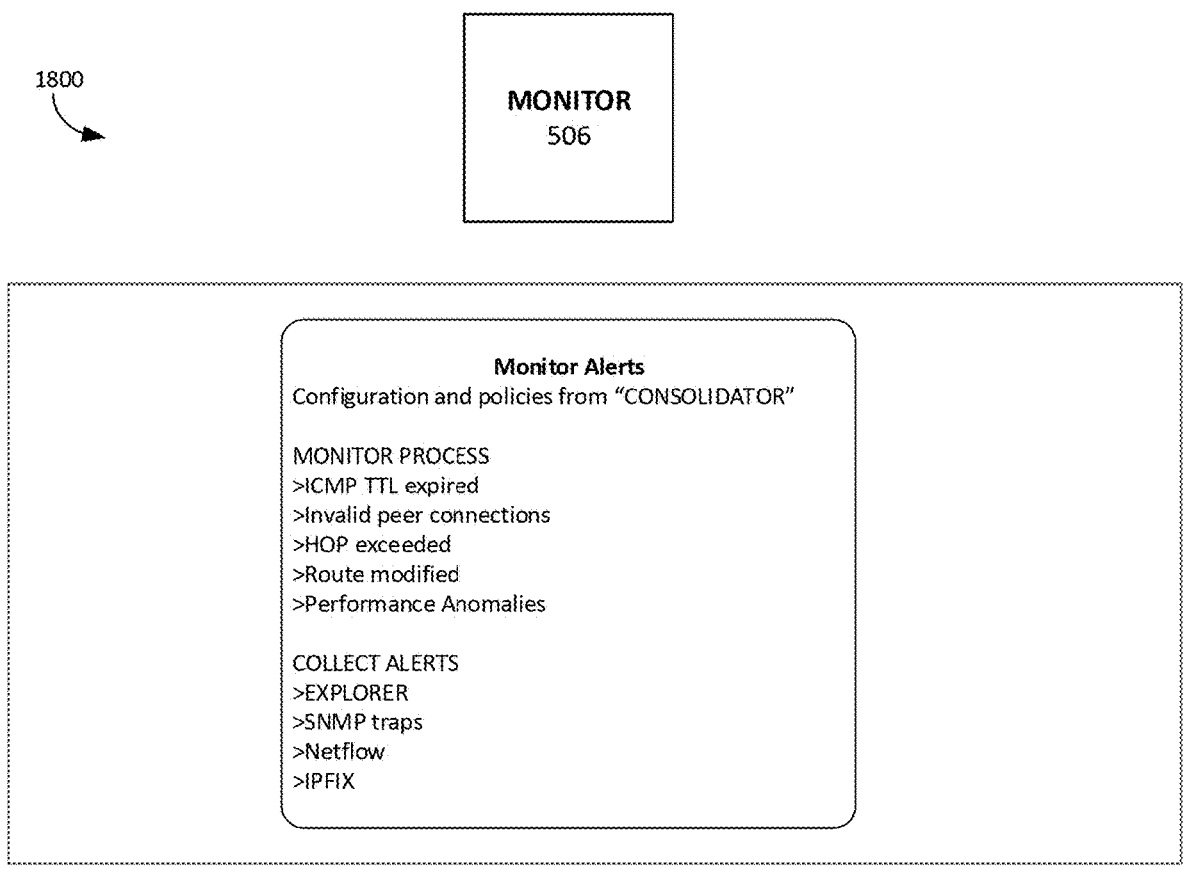
FIG. 18 illustrates elements and aspects of the Monitor Module506.

With reference to FIGS. 5 and 18, HOP Sphere Monitor Module ("Monitor Module") 506 enables real-time discovery of devices attempting to communicate outside respective approved HOPvLMT Spheres. Monitor Module 506 also enables real-time discovery of devices for which Hop jitter or Hop variations are causing communications difficulties.

Monitor 506 component listens to Internet Control Message Protocol (ICMP) packets, or a remote router using NetFlow to send to Monitor notification of ICMP HOPvZR0 expired, HOP expired notices from the network firewall, outside, from routers using NetFlow feeds from any other internetwork components remotely. Firewalls can run NetFlow, so Monitor 506 does not necessarily have to capture these ICMP packets discretely, but may optionally use internetwork components using NetFlow data from other equipped router like devices. NetFlow can act as a remote Monitor, configured to send alerts received on ICMP Packet discard notifications due to HOPvZR0 count expiration. The ICMP HOPvZR0 expired packet for given device, and the information inside that alert tells us what IP and why the packet was not delivered, and so we end up knowing, for instance, when a device that is configured for a HOPvLMT=10 count of 10 tries to go beyond 10 HOPvLMT=10. When it reaches the 10th router, that router is instructed when the HOPvRZ0 reaches zero to discard that packet. That's how the Monitor knows when a device is exceeding its set HOPvLMT count and requires modification or to further assert communications security denial.

In some embodiments, NetFlow can act as a remote Monitor 506, configured to send alerts received on ICMP Packet discard notifications due to Hop count expiration. The ICMP time-to-live expired packet for given device, and the information inside that alert tells what IP and why the packet was not delivered, for instance, when a device that is configured for a hop count of 10 tries to go beyond 10 hops. When it reaches the 10th router, that router is instructed to discard that packet when the hop count reaches zero. Thus, Monitor 506 knows when a device is exceeding its set Hop count and either requires Hop count modification or further assert communications security denial.

When the packet is discarded, the router is instructed by Internet Engineering Task Force, IETF, or draft RFCs, to send the packet back to the originator of the packet, notifying them that the packet has been discarded because time-to-live expired. When it sends that packet back, it uses the copy of the originating header that was discarded and returns it. Thus, inside that header is the unique IP fragment Identifier, so the recipient can reconstruct exactly what packet was discarded if programmed to do so.

Most systems typically used this ICMP information only for internet control purposes and the Internet standards do not suggest or dictate the actions required by the recipient. The message may include the originating packet information details, the discarding router information, and identify that a packet was discarded from an originator because it's time-to-live expired. Some environments filter ICMP messages, so Monitor 506 sources may be placed prior to firewalls where messages are not filtered.

In this way security systems and professionals know the device is trying to escape a set HOPvLMT limit boundary. If a device configured for a HOPvLMT=10 count of 10 is trying to communicate beyond its HOPvLMT count, Monitor 506 triggers on the ICMP HOP discard message and sends an alert to Consolidator 514 or Setter 508. Setter 508 then sends a message to Explorer 504, which then investigates the peer device with other remote systems to troubleshoot why the packet escape attempts are not being delivered indicating, e.g., if the internetwork is broken. The system can then send SNMP traps and alerts to network management system or other SNMP management systems employed by the organization to notify network or security operations of the problem.

Monitor Module 506 listens at packet ingress and egress points to the network. Monitor Module 506 listens for Internet Control Message Protocol ("ICMP") notices from nodes where the HOP is decremented to zero HOPvZR0 by a network router. Packets are sent across the network with a specific initial HOP value, an 8-bit number, of 0-255 decimal. As the packets traverse routers, the HOPvTRN value is decremented, e.g., arriving with 28 HOPvTRN=28 left and leaving with a HOP value of 27 HOPvTRN=27. When the value is decremented to zero HOPvZR0, the router discards the packet and records header information in another packet sending a notification back to the originating device using the ICMP message (containing the original IP header that expired and the next 64 bits of the next protocol such as TCP with its application protocol information). In the ICMP message it provides a copy of the original header of the sending device, and the new IP header necessary to address the message. Each packet in IP is numbered as an IP Fragment ID, therefore the original sending node can identify which numbered packet was expired and discarded. This provides enough information to the originating sender, if equipped with a Modifier 510 agent itself to change its own HOP within the policy range and destination allowed. Monitor 506 hears the ICMP, logs and investigates and reports to the system in case changes need to be made to the HOPvLMT count setting as part of the closed loop feedback system.

Monitor Module 506 parses the ICMP data HOP and the expiring header information to continue learning about the network topology and IP addresses. As Explorer 504 learns topology and geographical information, Monitor 506 stores all such metrics and events in a database for use by other modules. For example, Reporter 512 may use stored event data to provide dynamic feedback and or alert administrators of problems with a device's setting or perhaps a security hacking attempt by a device beyond the HOPvLMT sphere.

Monitor Module 506 listens for ICMP messages to detect attempts to communicate with a device that is locked down by HOP. By monitoring ICMP packets, the system can determine when and where the HOPv expires or will expire. Monitor 506 can notify administrators that something outside an appropriate sphere of communication is attempting communications. This function can help alert administrators identify other devices that have HOP settings that could be vulnerable to similar security hacking attempts. Communicating pairs are known based on the original IP header and 64 bits of the TCP header or other header above the IP. Monitor 506 can determine which device is trying to communicate with the originating device and what protocol is used in attempting to communicate.

This security information can be used to detect an attempted penetration or unauthorized access at a device. Limiting the HOP value and discarding data upon HOP expiration protects against consummating connections beyond the established HOPvLMT radius. Monitor 506 logs which nodes are experiencing or about to experience HOP packet expiration. This information can be used, in some instances, to extend the HOPvLMT radius to another appropriate node or to otherwise modify the operations of other devices, as described regarding HOP Sphere Modifier Module ("Modifier Module" or "Modifier") 510. For example, Modifier Module 510 may continuously tailor the HOPvLMT radius to extend proper communication or curtail inappropriate communications with an improper device or location.

Thus, Monitor 506 monitors events from a variety of sources for packets being discarded by IP devices due to Hop value going to zero. The discarding device must also send an ICMP notification back to the sending device. The ICMP notice has valuable information for diagnosing the cause of the discard. Monitor 506 listens to many sources of ICMP notifications.

Monitor 506 performs various functions including direct network capture of packets and remote network capture of packets. Monitor 506 may perform SNMP or other network management traps from routers, firewalls or other internetwork components. Monitor 506 may perform cloud-based network capture, SNMP traps or security events. Monitor 506 may perform Netflow ICMP notifications.

HOP Sphere Setter Module 508

TTL/HOP Sphere Setter Module ("Setter Module" or "Setter") 508 enables automatic configuration of Setter for many devices using an algorithm to determine the optimal HOP based upon gathered information from Explorer 504 and Monitor 506. Setter 508 establishes/provides HOP values for discrete devices, or through DHCP devices. Setter provides IP address and HOPvLMT information to the Modifier 510 so it can set the HOPvLMT value for an IP address passing through Modifier 510. Modifiers 510 may run inside various enabled devices such as routers, firewalls, load balancers, VPN concentrators, WAN/App Optimizers or other internetwork component Modifier devices as may become available.

Setter Module 508 may implement policy-based settings using algorithms to make policy changes or to accommodate changes in network topology or administrative changes as needed. Setter 508 allows an administrator or automatic algorithm to configure a HOPvLMT radius, for a device(s) and can automatically modify HOP values. Setter 508 can work with other modules to provide information on which to make decisions, and to help administrators make those decisions, and policies. Setter Module 508 is used to inform Modifier 510 of a device's recommended setting. Modifier 510 may include a list of communicating pairs with devices at a location, pre-populated from Analyzer 502 and Explorer 504 so as not to have to insert the IP address into the communicating device, but rather because it exists, it is then inserted into the configuration to select that IP address and HOPvLMT setting. Using the statistical information from Analyzer 502 and Explorer 504, administrators can decide what the appropriate HOP is to be for that device.

Setter Module 508 allows administrators to set HOP values based upon policy, IP address range, or location, or the purpose of a device. The HOP value setting affects the ability of a device to communicate beyond its required peers using HOP limits. Once Setting Module 508 has been populated with information from Analyzer Module 502 and Explorer Module 504, the IP address of the device is provided with statistical information about that IP address. The device IP address can then be added with DNS name or other information, e.g., or MAC address for more exacting device interface identification.

Setter Module 508 allows administrators to set policies for devices. Setter Module 508 may establish defaults or make recommendations based upon historical communications or algorithm assumptions. Setter Module 508 presents the administrator with the IP address and other relevant information, and historical communications sphere information from Explorer Module 504. Setter Module 508 uses information from Analyzer Module 502 and Explorer Module 504, and presents all the relevant information to an administrator. Setter Module 508 can present recommendations for an appropriate communicating sphere for a device/machine and relevant applications for its communicating pair peers. The administrator may select a default or custom HOP for a given device, e.g., or a given router or server. The HOP settings are recorded in the HOP database and set in Setter Module 508. Setter Module 508 provides HOP setting information to Modifier Module 510, which executes the changes on the devices.

Thus, Setter Module 508 is the component that receives statistics on devices from the Analyzer database. Setter 508 may contains policy for hop setting variables. For example: if Analyzer 502 reports a high Hop of 21 and low Hop of 18, policy set in Consolidator 514 may be applied at 10 to 20% higher Hop count based on the confidence factor derived by sample history from Analyzer 502 and technical experience learned in the network environment. Alternatively, Setter 508 may be provided alternate values by a human administrator. Setter 508 may connects to the discreet device to change the Hop value in an End Point system. Setter 508 may connect to the discreet device to change the Hop value in an End Point system. Setter 508 may log all changes to any system. If a device cannot be set directly or indirectly, it may be controlled by a real-time Modifier 510 service agent placed in a third-party firewall, Load Balancer, VPN Controller, Router, Optimizer or other internetwork device that receives updated information from Setter Module 508 to change Hop values as the packet transmits through the device.

HOP Sphere Modifier Module 510

TTL/HOP Sphere Modifier Module ("Modifier Module") 510 enables real-time setting of HOP values as device packets pass through Internetwork appliances. Modifier Module 510 also enables automatic dynamic changes of HOPvLMT value settings to protect devices or adapt to changing conditions and hacking attempt events based on information provided by Monitor Module 506, Explorer Module 504 and Setter Module 508. A special version of the Modifier Module 506 may be embedded inside an end device allowing the end device to change its own HOPvLMT count dynamically within a range set by policy. Such implementations benefit from ICMP packets arriving with discard notifications, allowing them to adapt their HOP to the needs of the network within policy.

Modifier Module 510 may communicate directly with devices, DHCP servers, SNMP configurations, and internetwork devices to adjust settings and provide real-time live HOP value changes. With Modifier Module 510 installed inside a device itself, an appliance could be used to execute changes as packets traversed the device to change its HOP configuration. This allows more dynamic and scalable management of Hop sphere security.

Modifier Module 510 ultimately sets the HOP value or modifies the HOP value to protect a given node or device from communicating too far as its packets traverse the Modifier. Setter Module 508 applies policies to establish HOP settings and Modifier Module 510 executes the modification of HOP settings on devices or by setting values for use by a Modifier in a router running Modifier software or other appliance such as a firewall or a WAN optimizer or an application optimizer or a load balancer. The HOP setting may be automatically placed on the device itself by changing the device's configuration. The HOP settings may be set by Modifier Module 510 on the device and/or in some intervening system such as a firewall or router, or a firewall application optimizer.

Modifier Module 510 may execute configuration changes in any number of other devices and internetwork components. Modifier Module 510 may change the HOP setting by communicating with the Active Directory Policy and or DHCP server and/or any intervening devices and applying the HOP limitation. Modifier Module 510 uses HOPvLMT setting configuration information to set remote devices and intervening devices that will intercept and change the HOP value on behalf of the device. Modifier Module 510 may actively push information to those devices or it may present an Application Programming Interface for other devices such as DHCP servers to learn what the appropriate HOP count may be. Modifier Module 510 may affect changes on devices or internetwork components through APIs to push or pull configurations.

Modifier Module 510 may take the form of an agent in an internetwork router, firewall, optimizer or other security device to perform live real-time changes of HOP instead of the HOP being changed in the device itself. In some cases Modifier Module 510 gets information from Setter Module 508, placing it in a memory array to rapidly make HOP changes in internetwork devices, e.g., protecting a whole data center of servers. Modifier Module 510 may be used to protect an organization's devices from sending out dangerously high HOPs by setting appropriate HOP value settings. In some cases, Setter Module 508 provides device HOP settings on devices directly while Modifier Module 510 in an internetwork device would change HOP in real time as packets traverse the device.

Thus, Modifier 510 may be a device through which packets traverse outside a security zone such as a data center router or firewall to another zone. As packets traverse Modifier 510, the Hop value is set from a data array containing IP addresses and Hop values required for traversing packets. Modifier 510 may be implemented in a firewall, load balancer, optimizer, router, switch tap device designed or programmed to change the Hop value of packets traversing the device. In some embodiments, Modifier 510 is implemented as high-speed hardware or software to perform various functions. In some embodiments, Modifier 510 recognizes the IP source or destination. In some embodiments, Modifier 510, changes Hop and other values in the IP/TCP header or data as required for optimized operation.

In some embodiments, settings changes by Modifier 510 require the IP, TCP or frame CRC checksum values to be modified to reflect the changed values in each header of each layer of protocol.

Hop Sphere Reporter Module 512

Hop Sphere Reporter Module 512 is a system that allows queries of the database data in other Hop sphere modules that are collecting, learning, adding to the database. For example, the data and settings available in database from Analyzer Module 502, Explorer Module 504, Monitor Module 506, Modifier Module 510, may be queried by Reporter Module 512. Reporter Module 512 can provide regular reports, e.g., daily/hourly, or upon receipt of certain information, e.g., in response to events logged by Monitor Module 506 or changes made by Setter Module 508. Reporter Module 512 may provide and store time-stamped and dated logs for reporting the chronology of events.

Reporter Module 512 may query against information collected or generated by any other module to run reports regarding the Hop sphere radius is for any given nodes, set of nodes or devices, or by protocol. Reporter Module 512 provides valuable information about the sphere of communications of important nodes that may hold classified or sensitive information.

During initial setup of the system, Analyzer Module 502 gathers data for all IP address peers. Explorer Module 504 gathers the Geo IP geographical information of IP devices on the Internet and resolves the HOPvLMT sphere to a geographical sphere. The administrator can generate reports about sensitive devices and respective hop spheres and geographical sphere. Such geographical information can be used to address security concerns of other devices in the system with access to the same geographical spheres, e.g., to protect other devices from known attackers.

Reporter Module 512 allows access to various information in the system including configuration data for HOP Sphere Radius Security Management System 500 to run reports: chronology reports, activity reports, change reports, and Hop count reports. Reporter Module 512 may generate standardized reports that are either scheduled or triggered. Scheduled reports may be generated hourly, daily, weekly, monthly, or some other interval.

Hop Sphere Consolidator Module 514 Manages

Figure 13:
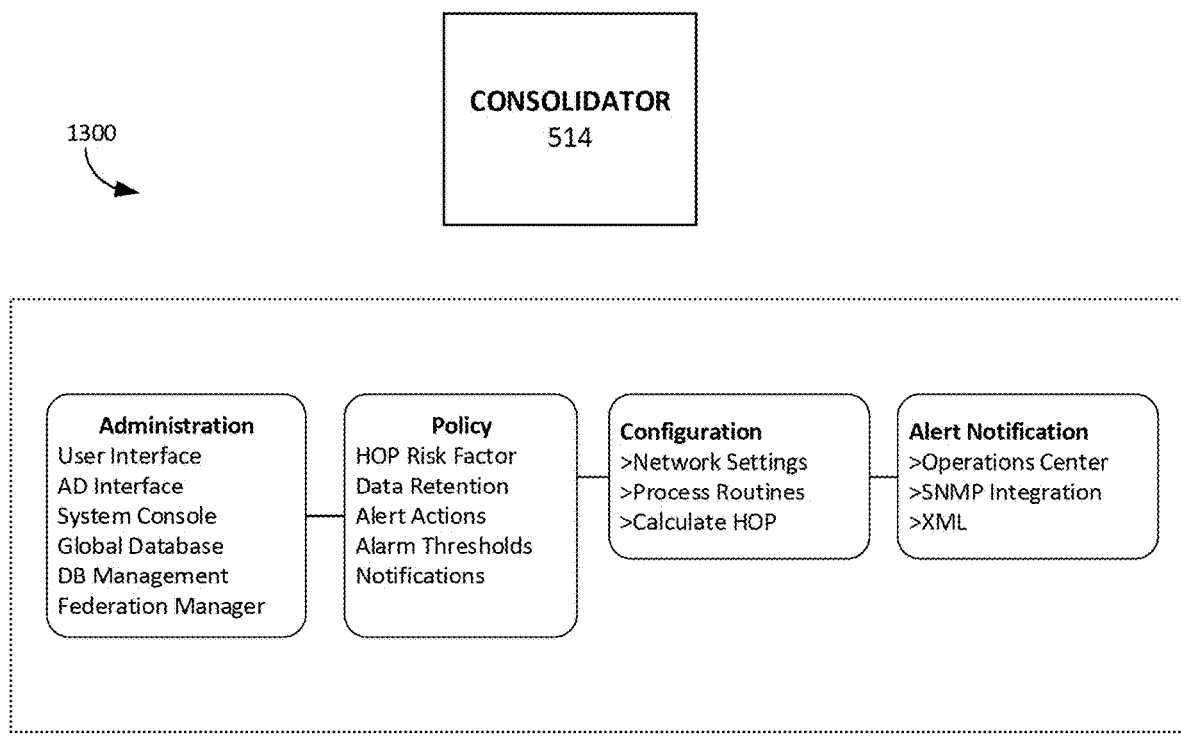
FIG. 13 illustrates elements and aspects of the Consolidator Module514.

With reference to FIGS. 5 and 13, the Hop Sphere Consolidator Module 514 provides central management and coordination of other modules of the Hop Sphere Radius Security system. Consolidator 514 is configured with distributed and local modules. In a worldwide implementation, multiple distributed components could be centrally administered. In remote distributed locations, a super-Consolidator 514, 516 may function as a local Consolidator 514 for each respective region to allow local operation even if connections are lost to a central or worldwide Consolidator 514, 516. Consolidators 514 can also be redundant for disaster recovery and intrinsic backup across national or regional borders. Consolidator 514 allows policies to be set for Hop algorithm calculations. Notifications to other network and security monitoring systems and operations centers are configured and sent by policies set in Consolidator 514.

Reporter Module 512 interfaces with the configuration of Consolidator Module 514 to gather and integrate disparate module information for reporting based upon the configuration of Consolidator Module 514. HOP Sphere Radius Security Management System 500 and the various modules can be implemented in one appliance or in many distributed components.

The Consolidator Module

Consolidator Module 514 manages secure registration of, and secure communications between multiple sets of, or subsets of the other modules in HOP Sphere Radius Security Management System 500, particularly for large enterprises or internet service providers. This enables application of distributed or single operations and functions in a single device or many distributed modules. For instance, HOP Sphere Radius Security Management System 500 and the various modules can be implemented together in one appliance, or even device itself such as a Virtual host, or the modules can be implemented in separate appliances. For example, a Hop Analyzer Module 502 may be implemented in a remote device itself or an Analyzer Module 502 and Explorer Module 504 may be implemented together inside a Monitor in a remote device. These modules can be distributed as needed to allow scalability across large enterprises or internet service providers. Consolidator Module 541 manages configurations for subsets of the various modules, and may provide a centralized interface, e.g., a centralized Reporter Module 512, and centralized settings for various Hop Sphere system modules.

Consolidator Module 514 allows the modules to be implemented separately or distributed, e.g., in a firewall, load balancer application optimizer, router, or other network switch or network component such as a Virtual Switch, or they could be an independent software module embedded in the device itself with all module functions in an agent. Whether the various modules are consolidated or distributed, the Hop Sphere Radius Security Management System 500 protects devices from being accessed beyond their required sphere of communications, and makes them less vulnerable to attack. The modules can be combined into one appliance or distributed into several parts. For instance, across many data centers within an organization at various locations across the world.

Once the HOP metrics for a communicating pair are known, Setter Module 508 establishes a HOP count value to be applied by one of several methods. In some embodiments, Setter 508 changes the device HOP discretely, or using DHCP, or Active Directory Group Policy. If these methods cannot be used to change the setting centrally as packets traverse Modifier 510. The requested data and Modifier Module 510 applies the HOP count value setting to the data packet headers as they traverse. Monitor Module 510 continuously monitors the HOP count for the data packets to determine whether they have expired, have been delivered, or have been discarded. (Stage 750). According to the HOP count values established and applied to the data packets, the respective final node discards the data packets upon expiry of the HOP count value. (Stage 755).

Figure 19:
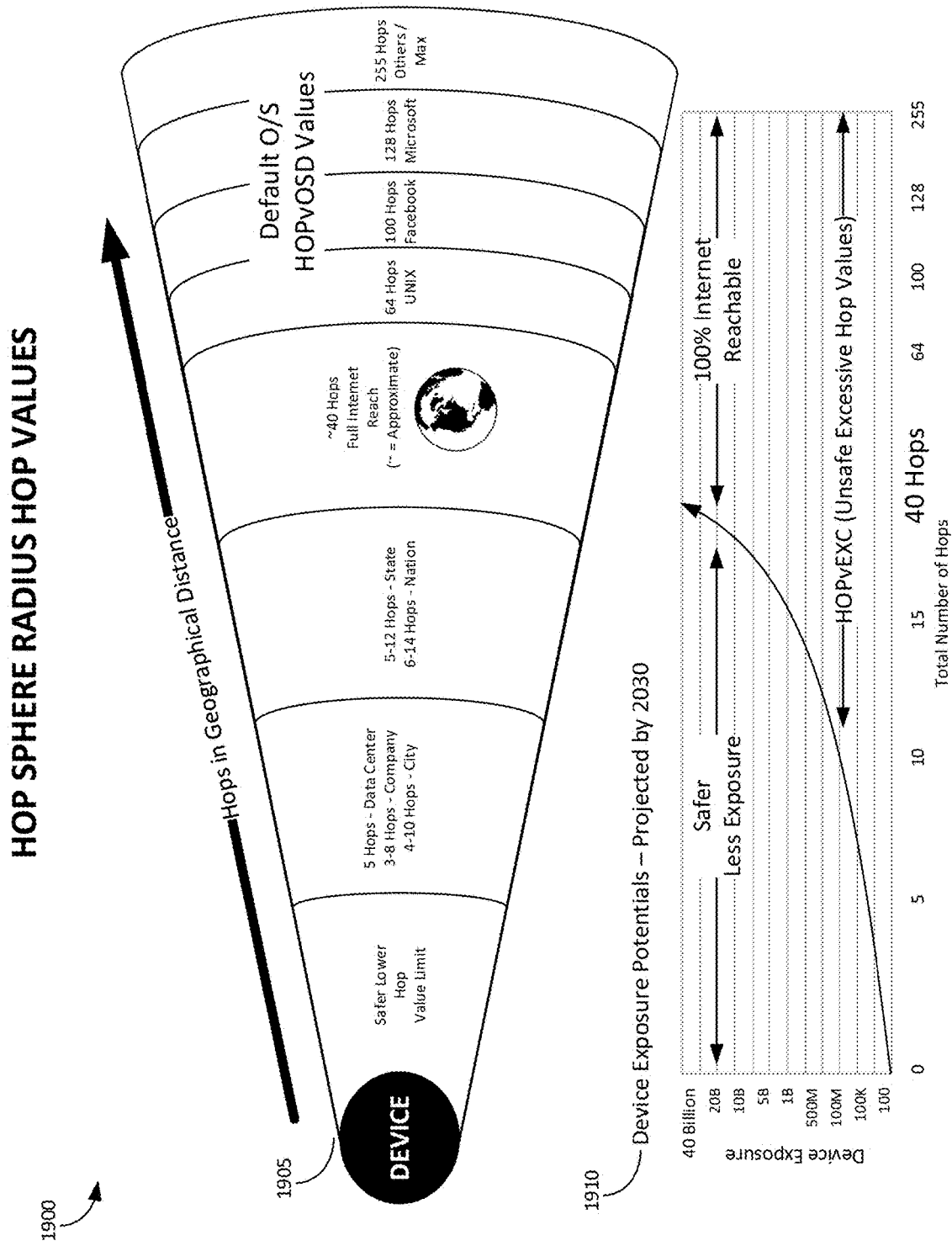
FIG. 19 titled "Global HOP Value Diagram" depicts industry operating system HOPvOSD defaults, the radius of hops across the Internet and the concept that greater than required HOPs expose increasing exposure of devices HOPvEXC to more potential hacker devices.

With reference to FIG. 19, "Hop Sphere Radius HOPv", 1905, illustrates examples of hop count between HOPcBTN with respect to geographical distance from the relative position of the device. The device is shown on the left with hop consumption (HOPcBTN) between other devices on the right, showing the distance of operating systems defaults and maximums of (HOPvOSD) of 255 on the far right and closer devices between. Default HOPvOSD used by various operating systems are represented on the right. Despite millions of routers on the Internet, the path between any two devices is most often under forty (40) hops (HOPc) consumed between devices HOPcBTN. That means the default operating systems providing more than adequate HOPvOSD value to communicate with any device in the world. Examples of lower limited HOPvLMT count value to stay within a given geographical area are suggested. A HOPv beyond needed for the device to communicate with approved peers is considered excessive HOPvEXC. Excessive HOPvEXC allows communications to devices well beyond required approved peers. The (chart 1910) describes the massive projected growth of billions of Internet devices. It is estimated that each additional HOPv in addition maximum required for approved peers will expose devices to 1 billion potentially digitally lethal devices. Whether a distant suspect device initiates a connection or a trusted device initiates a session from an innocent web link on a safe web site or email, Hop Sphere Radius Security protects in both directions completely independent of a firewall that could be compromised allowing improper communications.

The following equation is offered as a basis for 30 hops and 30 billion devices:

Assuming the IP addresses are distributed evenly in a space and each hop covers the same distance, an estimate on how much more risk (expose to more IP addresses) may be obtained by adding one hop from the existing hop.

From a given server, the area covered by hop=pi*HR*HR. R refers to (radius for a hop).
H refers to (the number of hops from the given server) So the covered area difference between hop H and (H+1)=pi*(H+1)R*(H+1)R−pi*HR*HR=pi*(2H+1)RR For 30 hops, it covers all IP addresses in the world, that means the IP address density=(total IP addresses)/(pi*900*RR) then the number of IP addresses between hop H and (H+1)=(total IP addresses)*pi*(2H+1)*RR/(pi*900*RR)=(total IP addresses)*(2H+1)/900. For example, for hop 1, and 2, the difference=(total IP addresses)*3/900.
for hop 29 and 30, the difference=(total IP addresses)*59/900. The difference increases linearly to the number of hops. The Internet is not linear, nor is the relative location of a device, making this equation more representative of the concept of each HOPvEXC excessive hop beyond maximum required HOPvMXR adding significant risk. One additional excessive hop may add one billion more devices to attack surface.

Figure 20:
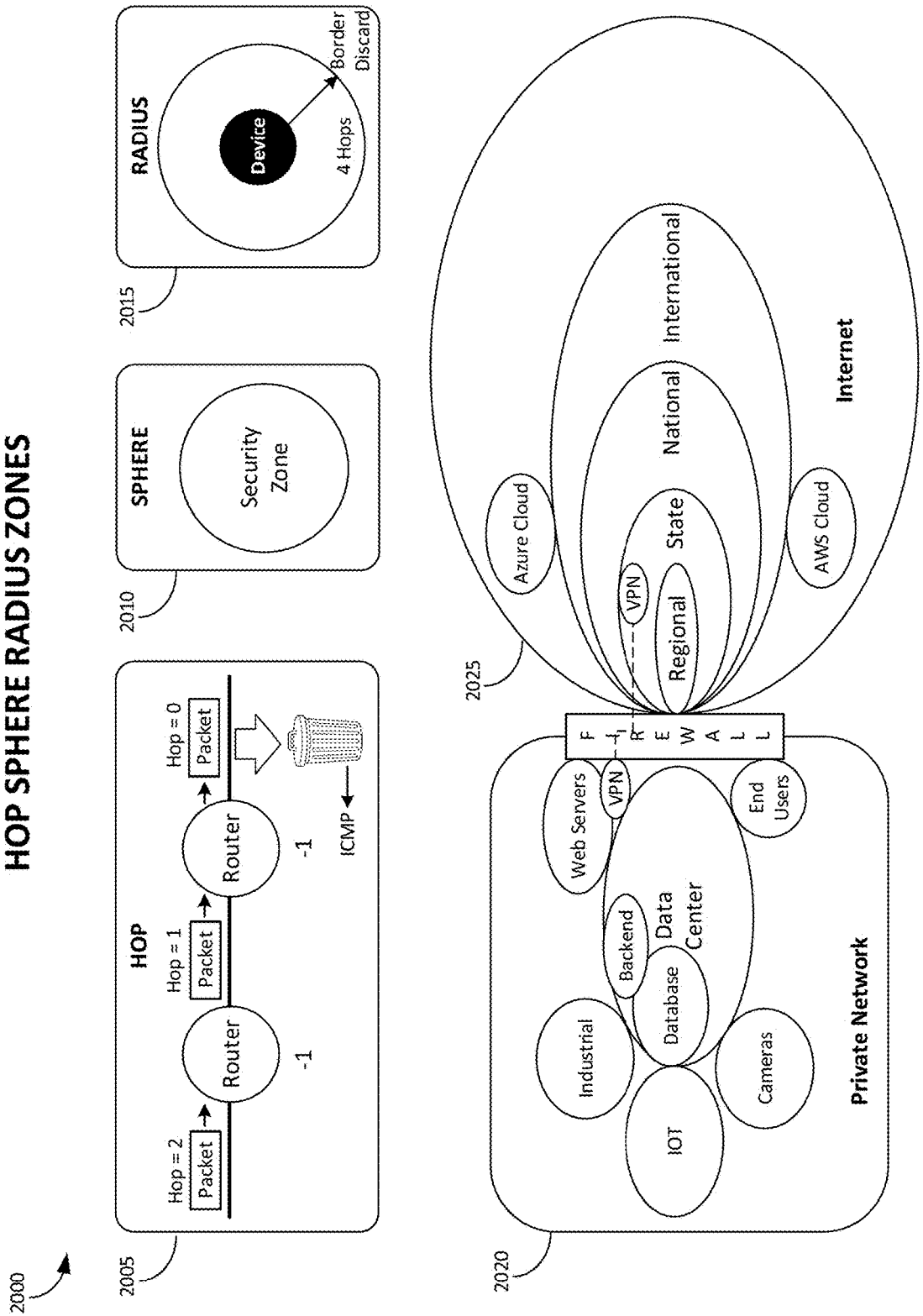
FIG. 20 illustrates example types of security protection zones or spheres in which communications are limited to within the zone.

With reference to FIG. 20 "Hop Sphere Radius Zone Definition," 2000 illustrates three concepts of embodiments of Hop Sphere Radius Security. The first concept is HOPvTRN at stage 2005, indicating a packet traversing the network through a router, causing the HOPvTRN hop transit value in the IP header to be decremented as it passes. When the HOPv is decremented to zero (0) HOPvZR0, the packet is discarded and an ICMP HOPvZR0 message is sent to the packet originating source with a copy of the discarded packet's IP header and 64 bits of the upper layer data. HOPv values generally start at much higher values than the example shown in 2005. This example is shown as already in transit starting at two (2) and decrementing through two routers until it reaches zero (0) HOPvZR0 causing a discard. Hop (hop) is the term used to describe a packet passing or "hopping" through a router. The concept of "sphere" 2010 is a distance limiting digital border, much like a corral or pen where packets are limited to communication only with devices within the named sphere. Spheres or zones are named areas of control sequestering communications limited by HOPvLMT inside the sphere. Names of various types of spheres are represented in the Private Network stage 2020 and the Internet 2025. The concept of "Radius" 2015 is derived from the device being in the relative center, and the distance represented in hops to the border where discards occur, limiting communications before exiting. Although diameter may be thought appropriate, the term Radius refers to the 360 degree boundary around the device, thus Radius is used. Combined, it is Hop Sphere Radius Security. Each private network 2020, public or private cloud 2025, Internet can carve out a sphere for hop value limit HOPvLMT protection. Within the Internet 2025, the sphere distance is roughly accurate. Private network spheres are highly accurate definable with high granularity. Protecting the Database Sphere inside the Datacenter Sphere is protected communications outside the Sphere and each device becomes relative to its own Sphere as HOPvLMT values set on an individual Database to create its own custom Sphere for each device.

Figure 21:
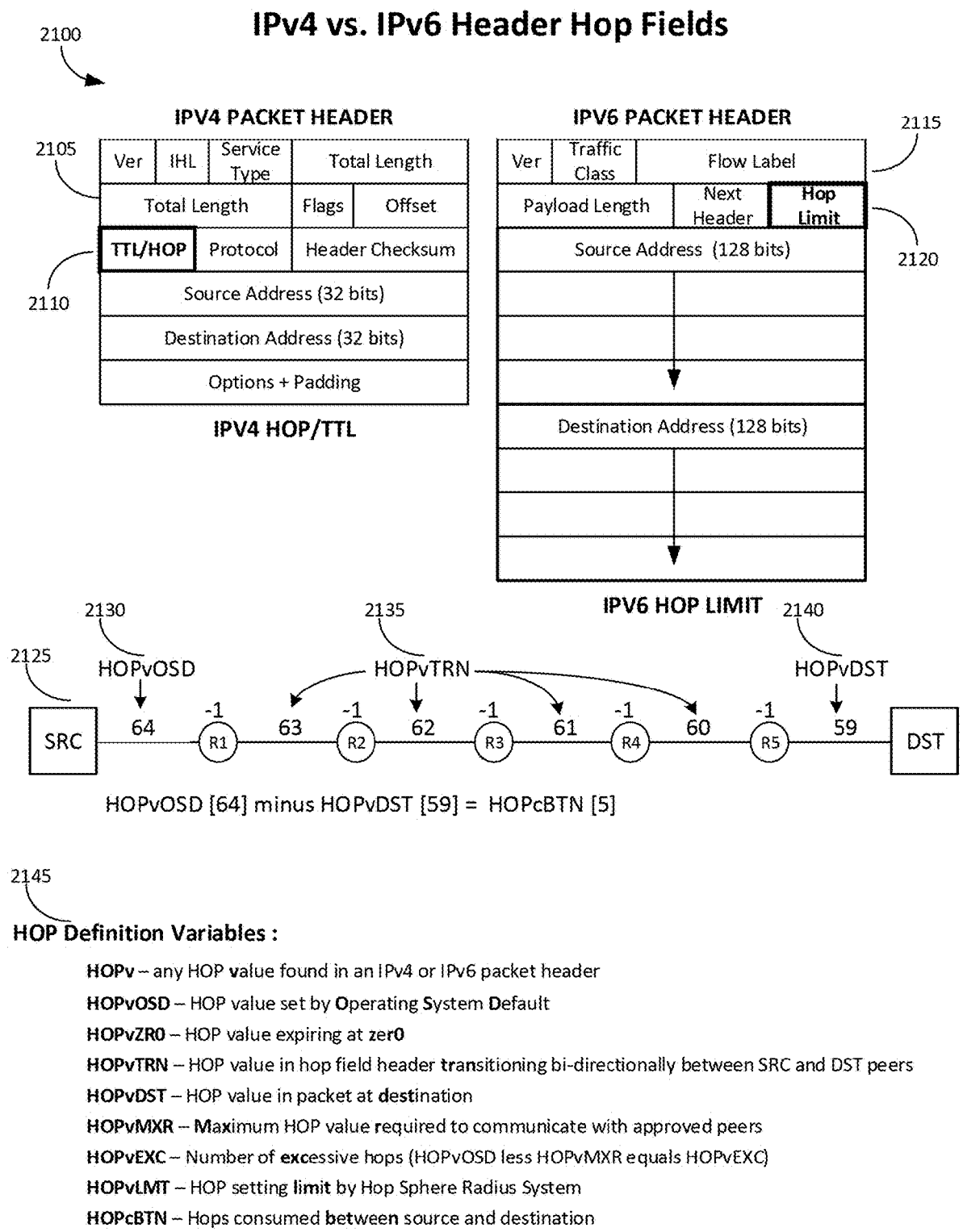
FIG. 21 illustrates contents of IPv4 vs. IPv6 Header HOP Fields.

With reference to FIG. 21 IPv4 vs. IPv6 Header Hop Fields. The headers of IPv4 and IPv6 share the same 8 bit wide field for HOP value. IPv4 uses the term Time-to-Live (TTL) 2110 and or HOP while IPv6 only uses the term HOP Limit 2120. They both operate similarly except IPv6 does not have fragmentation numbering. Callout 2125 refers to traversal of packets from a source device to a destination device. The source HOPvOSD 2130 default operating system value is 64, decrementing in transit, represented as HOPvTRN 2315, until the packet arrives at the destination HOPvDST 2140. HOPs consumed between source and destination are calculated HOPvOSD=64 minus HOPvDST=59 the result is HOPvBTN=5 HOPs. Callout 2145 provides a basic reference of HOP values.

Some embodiments described herein may be encoded in a machine-readable medium having instructions, which may be executed in a computer system (or other electronic device(s) such as a digital processor) to perform a method in accordance with some embodiments of the present invention. In general, a machine-readable medium can include any mechanism for encoding information in a form (e.g., software, source or object code, functionally descriptive information, etc.) readable by a machine (e.g., a computer) including tangible storage incident to transmission of the information. A machine-readable medium may include, but is not limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations, or structures described herein as a single instance, or vice versa. Boundaries between various components, operations, and data stores are somewhat arbitrary, and particular operations are illustrated in the context of specific illustrative configurations. Other allocations of functionality are envisioned and may fall within the scope of the invention(s).

Those skilled in the art will appreciate that embodiments described in the foregoing may be practiced in conjunction with any number of data transmission protocols and that the system 100 described herein is merely one exemplary application for the invention.

Various features and advantages of the invention are set forth in the following claims.

The invention claimed is:

1. A method of detecting an unauthorized access, phish attempt, or ransomware attempt based on limiting network transmission of data packets within an authorized device range, the method comprising:
establishing a router hop limit value to predetermine an authorized device range for data packets to be exchanged between communicating pair devices;
limiting transmission of data packets to within the predetermined authorized device range by discarding data packets after reaching the predetermined authorized device range as a function of the established hop limit value, to exclude devices beyond the predetermined authorized device range;

sending an Internet Control Message Protocol (ICMP) message from a discarding router with a discarded packet Internet Protocol (IP) header and 64 bits of protocol layer data, the message IP header data including a unique IP Socket Fragment ID used to identify a particular packet sent by an originator, source and destination IP addresses (IPv4 & IPv6); and wherein the 64 bits of protocol layer data identify an application protocol on which the attempt was made.

2. The method of claim 1, further comprising using the unique IP Socket Fragment ID, the source and destination IP addresses and a protocol UDP/TCP (Transmission Control Protocol/User Datagram Protocol) port number to notify a Security Operations Center (SOC) of at least one of an unauthorized attempt, phish attempt, and a ransomware attempt.

3. The method of claim 2, wherein notification of at least one of an unauthorized attempt, phish attempt, and a ransomware attempt trigger automated actions to quarantine the unauthorized access, phish attempt or ransomware attempt.

4. The method of claim 1, further comprising notifying a Security Operations Center (SOC) of a Man-in-the-middle scenario upon detection of incongruent hop counts for a given unique communications pair UDP/TCP socket and IP Socket Fragment IDs in a respective IP header.

5. The method of claim 1, wherein internal (Request For Comment 1918) RFC 1918 private IP addresses are geo-located using a GeoIP of a nearest Internet router to a private subnet.

6. The method of claim 5, further comprising locating the private subnet IP Addresses, using the nearest Internet IP Address.

7. The method of claim 5, further comprising notifying a Security Operations Center (SOC) of a Man-in-the-middle scenario upon detection of at least one of a man-in-the-middle Virtual Private Network device by detection of disproportionate round trip latency from the GeoIP or RFC1918GeoIP.

8. The method of claim 1, further comprising setting a gateway of hop-protected devices to a system to enable forced collection of sessions and to execute hop changes to establish the predetermined authorized device range within a Cloud environment.

9. The method of claim 1, executed by at least one of an Analyzer Module, Collector Module, Alarm Module, Explorer Module, Setter Module resident within at least one of a Router, Switch, Firewall, Network Component, Security Device and End Computing Device.

10. The method of claim 1, further comprising determining which devices communicated with a suspect IP Address and alerting such devices of a potential threat.

* * * * *